(12) United States Patent
Vadlamani et al.

(10) Patent No.: US 8,040,276 B2
(45) Date of Patent: Oct. 18, 2011

(54) GENERATION OF MULTI-SATELLITE GPS SIGNALS IN SOFTWARE

(75) Inventors: Sastry Vadlamani, Bangalore (IN);
Vrishti Agrawal, Bangalore (IN);
Sanjeev G. Dhumawad, Bangalore (IN);
Pramod Subramanyan, Bangalore (IN);
Abhay Samant, Bangalore (IN)

(73) Assignee: National Instruments Corporation, Austin, TX (US)

( * ) Notice: Subject to any disclaimer, the term of this patent is extended or adjusted under 35 U.S.C. 154(b) by 228 days.

(21) Appl. No.: 12/434,769

(22) Filed: May 4, 2009

(65) Prior Publication Data

US 2010/0127918 A1    May 27, 2010

Related U.S. Application Data

(60) Provisional application No. 61/117,484, filed on Nov. 24, 2008.

(51) Int. Cl.
*G01S 19/23*    (2010.01)
(52) U.S. Cl. .................................................. 342/357.62
(58) Field of Classification Search ............. 324/357.06, 324/357.62; 342/357.06, 357.62
See application file for complete search history.

(56) References Cited

U.S. PATENT DOCUMENTS

| 5,093,800 A * | 3/1992 | Ifune .............................. 703/13 |
| 5,420,592 A | 5/1995 | Johnson |
| 5,663,734 A | 9/1997 | Krasner |
| 6,289,041 B1 | 9/2001 | Krasner |
| 6,571,082 B1 * | 5/2003 | Rahman et al. ............. 455/67.11 |
| 6,735,523 B1 * | 5/2004 | Lin et al. ........................ 701/216 |
| 6,760,582 B2 * | 7/2004 | Gaal ............................... 455/423 |
| 6,825,801 B1 * | 11/2004 | Coldiron et al. ......... 342/357.62 |
| 7,432,856 B1 * | 10/2008 | Hornbostel et al. .......... 342/372 |
| 7,596,465 B2 * | 9/2009 | Ristau et al. .................. 702/116 |
| 2010/0145615 A1 * | 6/2010 | McCrank et al. ............. 701/213 |

FOREIGN PATENT DOCUMENTS

JP    03251778 A  * 11/1991

OTHER PUBLICATIONS

"LabSat—GPS Simulator, Recorder and Replayer"; Retrieved from Internet on Jul. 31, 2009: http://www.labsat.co.uk/.

(Continued)

*Primary Examiner* — Thomas Tarcza
*Assistant Examiner* — Frank McGue
(74) *Attorney, Agent, or Firm* — Meyertons Hood Kivlin Kowert & Goetzel, P.C.; Jeffrey C. Hood

(57) ABSTRACT

A method for testing GPS receivers may read GPS files with data for a plurality of GPS satellites, and two or more GPS satellites may be selected from that data. The method may receive parameters for a GPS receiver to be tested. The method may generate two or more GPS signals for the two or more selected GPS satellites. The method may operate on the two or more GPS signals using the received parameters for the GPS receiver to generate two or more calculated GPS signals. These two or more calculated GPS signals may be re-sampled to a common rate. The two or more re-sampled GPS signals may be added together to create a composite GPS signal. The composite GPS signal may be generated using a hardware signal generator, where the composite GPS signal used to test the GPS receiver.

19 Claims, 14 Drawing Sheets

OTHER PUBLICATIONS

Phillip Martin Corbell, Second Lieutenant, USAF; "Design and Validation of an Accurate GPS Signal and Receiver Truth Model for Comparing Advanced Receiver Processing Techniques"; Air Force Institute of Technology; Mar. 2000; 228 pages.

Dennis M. Akos; "A Software Radio Approach to Global Navigation Satellite System Receiver Design"; Ohio University; Aug. 1997; 128 pages.

Alison Brown, Neil Gerein, and Keith Taylor; "Modeling and Simulation of GPS Using Software Signal Generation and Digital Signal Reconstruction"; NAVSYS Corporation; Proceedings of the ION National Technical Meeting, Jan. 2000, Anaheim, CA; 7 pages.

Lei Dong; "IfGPS Signal Simulator Development and Verification"; Geomatics Engineering; Dec. 2003; 182 pages.

Kenn Gold and Alison Brown; "Architecture and Performance Testing of a Software GPS Receiver for Space-based Applications"; NAVSYS Corporation; Proceedings of IEEEAC, Big Sky, Montana, Mar. 2004; 13 pages.

Avram K. Tetewsky and Arnold Soltz; "GPS MATLAB Toolbox Review"; GPS World; Oct. 1998; 6 pages.

Eric Holm, Alison Brown, and Richard Slosky; "A Modular Reprogrammable Digital Receiver Architecture"; ION 54th Annual Meeting, Jun. 1998, Denver, Colorado; 5 pages.

Russell Rzemien and Jay F. Roulette; "Coherent Data Collection Efforts in Support of Phalanx"; Johns Hopkins APL Technical Digest, vol. 18, No. 3, 1997; 15 pages.

Kees Stolk and Alison Brown; "Bistatic Sensing with Reflected GPS Signals Observed with a Digital Beam-Steered Antenna Array"; NAVSYS Corporation; Proceedings of ION GPS 2003, Portland, Oregon, Sep. 2003; 10 pages.

* cited by examiner

| Command | Description |
|---|---|
| GGA | Provides longitude and latitude information |
| GLL | Returns location and position fix quality |
| GSA | Contains information such as whether a position fix has been achieved |
| GSV | Provides information about satellites in view |
| RMC | Returns both position and GPS time of week |
| YTG | Contains receiver velocity information |

GENERATION OF MULTI-SATELLITE GPS SIGNALS IN SOFTWARE

PRIORITY CLAIM

This application claims benefit of priority of U.S. provisional Patent Application Ser. No. 61/117,484 titled, "Generation of Multi-satellite GPS Signals in Software," filed Nov. 24, 2008, whose inventors were Sastry Vadlamani, Vrishti Agrawal, Sanjeev G. Dhumawad, Pramod Subramanyan, and Abhay Samant, and which is hereby incorporated by reference as though fully and completely set forth herein.

FIELD OF THE INVENTION

The present invention relates to the field of global positioning systems, and more particularly to a system and method for software simulation of signals from multiple GPS satellites.

DESCRIPTION OF THE RELATED ART

Global positioning systems (GPS), such as NAVSTAR GPS, employ a constellation of satellites that collectively cover the globe and that generate respective microwave signals that GPS receivers may utilize to compute their location, speed, direction, and time. More specifically, GPS receivers compute the location (in terms of latitude, longitude, and altitude) and time (in terms of Greenwich Mean Time/Universal Time Code (GMT/UTC)) based on the computed delays in received signals from multiple satellites with known locations and movement patterns.

GPS is a U.S. Department of Defense developed, worldwide, satellite-based radio-navigation system. The GPS satellite constellation comprises 24 satellites providing two service levels—the Standard Positioning Service and the Precise Positioning Service. While GPS was originally developed as a military positioning system, it has significant benefits for civilian use as well, such as use of GPS receivers in one's car, boat, or cell phone.

The Standard Positioning Service (SPS) provides the GPS L1 frequency, which contains the coarse acquisition (C/A) code and navigation data message. The L1 navigation message contains clock corrections; ephemeris data; satellite health and accuracy; and the identification of the satellite (Almanac data). The SPS is available to all GPS users on a continuous, worldwide basis.

The Precise Positioning Service (PPS) provides accurate military positioning service available to authorized users only. The PPS is provided on the GPS L1 and L2 frequencies. The PPS was primarily designed for the U.S. military, and thus P(Y) code capable military users can obtain positioning data that is much more accurate than that of the C/A code users.

The system uses three pseudo-random noise (PRN) ranging codes. The C/A code has a 1.023 MHz chip rate (a period of one millisecond (ms)) and its primary use is to acquire the P-code. The precision (P) code has a 10.23 MHz rate, a period of 37 weeks, and is normally restarted every week at the Saturday/Sunday boundary. The precision (P) code is the principal navigation ranging code. The Y-code is used in place of the P code whenever PPS capability is denied to unauthorized users.

Each GPS satellite transmits on two L-band frequencies: L1=1575.42 MHz and L2=1227.6 MHz. In both the L1 and L2 (1.2276 GHz), GPS satellites may also generate an additional signal known as the 'P code.' This signal is a 10.23 Mbps BPSK modulated signal which also uses a PN sequence as a spreading code. The transmitted 'P' codes are used by the military for even greater position precision. In the L1 band, they are transmitted 90 degrees out of phase with the C/A codes to ensure that both can be detected at the same carrier. P codes in the L1 band have a signal power of −163 dBW and a power of −166 dBW in the L2 band. In contrast, the broadcast power for C/A codes in the L1 band is a minimum of −160 dBW on the earth's surface.

Each GPS satellite may also transmit a navigation message containing its orbital elements, clock behavior, and system time and status messages. In addition, almanac data is provided which gives satellite specific data for each active satellite.

A system for testing or validating GPS receivers requires either 1) actual field tests using the actual GPS satellites (in real time), which may not be practical, convenient, or precisely manageable, e.g., reproducible, or, 2) generation of signals that simulate the GPS satellite broadcasts. This latter approach requires a test-bed capable of generating a combination of signals from multiple such satellites, where each signal is delayed and Doppler spread, e.g., to represent the relative velocity, acceleration, jerk, for each satellite as perceived by the GPS receiver.

Current GPS generator/satellite emulators available commercially, e.g., emulation systems currently provided by AGILENT, SPIRENT and CAST, are hardware only solutions, which have high cost and limited flexibility, and generally present problems with respect to maintainability and convenience of upgrades. There are some software based GPS signal simulators, such as available as a toolbox for the MATLAB/SIMULINK programming system (available from THE MATHWORKS), such as the GPS RECEIVER Toolbox from DATA FUSION CO., SATNAV Toolbox from GPSOFT LLC, CONSTELLATION Toolbox from CONSTELL INC., GPS SIGNAL SIMULATION Toolbox from NAVSYS, and others. However, these software systems do not offer flexibility and easy connection capability to signal generating hardware.

Therefore, improved systems and methods for simulating GPS satellite signals are desired.

SUMMARY OF THE INVENTION

Various embodiments of a system and method for testing a GPS receiver using software simulations are presented below. The GPS receiver may be tested by a program, such as a graphical program, or by a stand-alone application.

A GPS simulator may allow a user to simulate real-world scenarios that use from one to 12 GPS satellites. The program may operate by reading one or more GPS files, such as the almanac and ephemeris files, to provide satellite information (such as are publically available). The GPS files contain information such as satellite location, direction, and velocity for a specific date and time. Alternatively the user can create the GPS files, such as using the System Effectiveness Model (SEM) and/or Receiver Independent Exchange Format (RINEX) formats, and store them on some type of a memory medium (e.g., hard drive, flash memory, RAM, etc.).

The GPS simulator can execute in either manual or automatic mode. In both modes, the user may enter the position of the GPS receiver being tested, such as by using longitude, latitude, altitude (LLA) or some other location format. The user may also enter any movement characteristics (e.g., velocity, acceleration) of the GPS receiver and the standard GPS time of the simulated measurement.

In the automatic mode, the GPS simulator may select the optimum satellites to be used for the GPS measurement. In the automatic mode, the GPS simulator may select up to twelve GPS satellites based on information from the GPS file(s) using criteria such as valid pseudorange, valid Doppler, acceptable elevation angle, satellite health, and time of week, beside others. Thus the GPS satellite selection process may be abstracted from the user. The GPS information may be used to create a baseband waveform, which is used in generating the GPS signal(s) for each GPS satellite.

In the manual mode, the user may select and/or override the automatic selection to select any one to twelve GPS satellites. This selection may not be restricted by range of pseudorange or Doppler values (unless a combination is impossible).

As a result, the GPS simulator may create a separate GPS signal for each GPS satellite being selected (i.e., either automatically or by the user). Each of the separate GPS signals may then be operated on independently until it is resealed later. In both modes, the user may specify one or more conditions for each of the GPS signals or for all of the signals.

The GPS simulator then may perform calculations on each of the GPS signals, such as the carrier frequency offset for each signal, the chip rate change, and signal scaling, among others. Other parameters may be provided, and thus tested, such as urban canyon effects, atmospheric conditions, weather conditions, solar conditions, etc.

Next, the GPS simulator may re-scale/resample most or all of the GPS signals. This may be necessary as the separate GPS signals, due to their inherent nature and/or the calculations, each may have a different rate. Once all of the GPS signals are at the same rate, they can be properly added, sample by sample at common timing intervals, to form a composite GPS signal.

Next, the composite GPS signal may be generated using a hardware signal generator, such as an RF signal generator. This generated composite GPS signal may be transmitted to the GPS receiver being tested. The GPS receiver may display the results on a display and/or provide data back to a computer (such as via the NMEA-183 interface). The computer may display the test results and/or analyze these results for the GPS receiver. This re-sampling may be performed continuously throughout execution of the GPS simulator, i.e., in order to account for continuously changing characteristics of the selected GPS satellites and/or the GPS receiver being tested.

BRIEF DESCRIPTION OF THE DRAWINGS

A better understanding of the present invention can be obtained when the following detailed description of the preferred embodiment is considered in conjunction with the following drawings, in which.

Figure 1A:
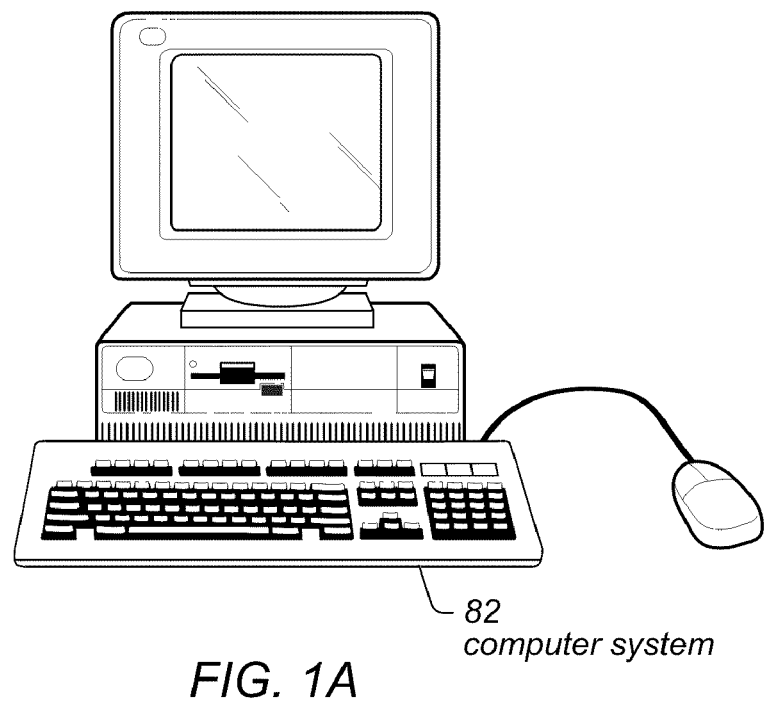
FIG. 1A illustrates a computer system operable to execute a program which implements embodiments of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1A—Computer System

FIG. 1A illustrates a computer system 82 configured to execute software according to various embodiments of the present invention, described in more detail below. As shown in FIG. 1A, the computer system 82 may include a display device operable to display a graphical user interface during execution of the software. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more programs which are executable to perform the methods described herein. Additionally, the memory medium may store programming development environment application (such as a graphical programming development environment, e.g., LabVIEW, provided by National Instruments Corporation) used to create and/or execute such programs. The memory medium may also store operating system software, as well as other software for operation of the computer system. Various embodiments further include receiving or storing instructions and/or data implemented in accordance with the foregoing description upon a carrier medium.

Figure 1B:
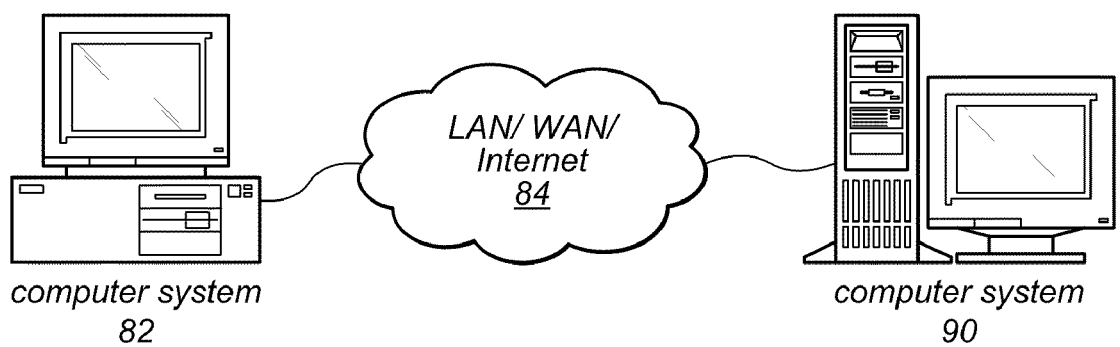
FIG. 1B illustrates a network system comprising two or more computer systems that may implement a method for generation of multi-satellite GPS signals in software, according to some embodiments.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, wired or wireless, among others. The computer systems 82 and 90 may execute programs in a distributed fashion. For example, computer 82 may execute a first portion of a program, e.g., the block diagram of a graphical program, and computer system 90 may execute a second portion of the program, e.g., a second portion of the block diagram of the graphical program. As another example, computer 82 may display the graphical user interface of a graphical program and computer system 90 may execute the block diagram of the graphical program.

In one embodiment, the graphical user interface of the program (which may be a graphical program or a text-based program) may be displayed on a display device of the computer system 82, and the program instructions (block diagram or other portion of the text-based program) may execute on a device coupled to the computer system 82. The device may include a programmable hardware element and/or may include a processor and memory medium which may execute a real time operating system. In one embodiment, the (graphical or text-based) program may be downloaded and executed on the device. For example, an application development environment with which the program is associated may provide support for downloading the program for execution on the device in a real time system. In another example, GPS test software may execute in a distributed fashion on the computer systems 82 and 90 to test one or more GPS receivers, which may be coupled to one or more of the computer systems 82 90, and/or another computer system (not shown) connected to the network 84.

Figure 2:
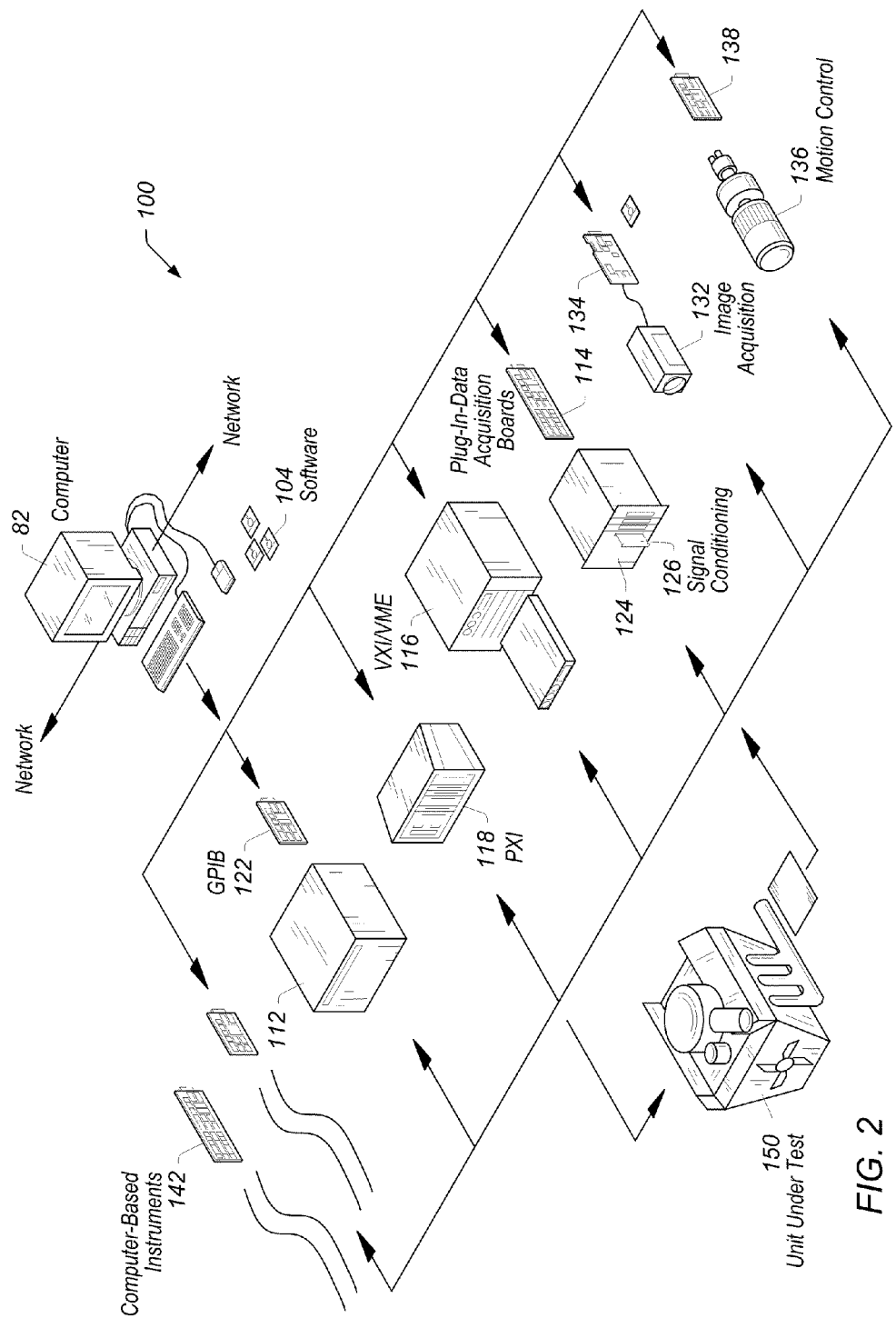
FIG. 2 illustrates an instrumentation control system that may implement a method for generation of multi-satellite GPS signals in software, according to some embodiments.

FIG. 2—Exemplary Instrumentation System

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, and testing one or more GPS receivers, among others.

FIG. 2 illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

For example, the system 100 may be used in a test and measurement application to test one or more GPS receivers, i.e., the UUT 150 could be the one or more GPS receivers that are being tested. Furthermore, the computer based instrument card 142 could be a radio frequency (RF) signal generator used to generate a composite GPS signal to test the one or more GPS receivers 150. The GPS receiver being tested may return test results via a NMEA-183 interface to the computer 82.

Graphical software programs which perform data acquisition, analysis and/or presentation, e.g., for measurement, instrumentation control, industrial automation, modeling, or simulation, such as in the applications shown in FIG. 2, may be referred to as virtual instruments.

The computer may include at least one central processing unit or CPU (processor) which is coupled to a processor or host bus. A memory medium, typically comprising RAM and referred to as main memory, is coupled to the host bus by means of memory controller. The main memory may store a GPS Simulator and/or a graphical program operable to test the one or more GPS receivers. The main memory may also store operating system software, as well as other software for operation of the computer system.

General Overview of a GPS Simulator

In some embodiments, a GPS simulator may be able to simulate GPS signals for up to 12 GPS satellites, although the system described herein may be easily scaled to simulate GPS signals for more GPS satellites. In some embodiments, the GPS simulator may be operable to generate a single signal (e.g., a GPS composite signal) corresponding to the four or more simulated GPS satellites. The generated GPS composite signal may be transmitted to and received by a GPS receiver (e.g., by a front end of the GPS receiver). The GPS composite signal may be affected by various factors, including power attenuation, varying pseudoranges, phase delay, doppler effects, and/or multipath effects, among others.

In some embodiments, in order to determine the location of a GPS receiver using the GPS simulator without time ambiguity, GPS signals from four or more GPS satellites may be received and processed by the GPS receiver. In some embodiments, the GPS receiver may be able to determine its location using GPS signals from only three GPS satellites. Furthermore, signals from each of the GPS satellites arriving at the GPS receiver may contain the following data:

Timestamp when it left the GPS satellite;

Any delay that may have occurred in reaching the GPS receiver from the respective GPS satellite;

Any Doppler shift and/or spreading due to relative velocity and acceleration between the GPS receiver and the respective GPS satellite Any clock bias and drift between the respective GPS satellite—GPS receiver pair; and Any power attenuation due to the path loss (i.e., the path between the respective GPS satellite and the GPS receiver.

The GPS simulator may generate L1 signals carrying a navigation message and C/A code. The navigation message may be in the form of bits M(n) transmitted at the rate of 50 bits per second, where each navigation bit may have a duration of $\frac{1}{50}$s (20 ms). The navigation message bits may be spread by a binary phase shift keyed ranging code C(n) (also referred to as a coarse/acquisition (C/A) code). The "spread" bits may be called chips. Each C/A code may have a unique sequence of 1023 chips, which may be pseudorandom in nature. The C/A code chips may be transmitted at 1.023 Mcps (Mega chips per second), meaning that each chip may have a duration of $$\frac{1}{102300} \sec (1 \text{ μs}).$$

Since 1023 chips correspond to $$\frac{1023}{1023000} \text{ s} = 1 \text{ ms},$$

each navigation bit may contain 20 repetitions of the C/A code. Hence 1 bit of navigation message, spread by 20 repetitions of C/A code may produce 20×1023=20460 chips. The values of the C/A code may be −1 or 1. The spreading of a navigation message bit by the C/A may be achieved by performing a modulo-2 addition of the navigation bit with C/A code chips, however, other techniques to spread the navigation message bit are contemplated. As a result, a navigation bit value of 0, once "spread," may produce 20460 unchanged chips. Similarly, a navigation bit value of 1, once "spread," may produce 20460 inverted chips.

Information from Almanac and Ephemeris files (see description below regarding FIGS. 3A/B) may be used by a GPS receiver to obtain a position fix. At a high level, a GPS receiver may return position through a simple triangulation algorithm, once the distance to each GPS satellite (pseudorange) may be known. In fact, a combination of pseudorange and GPS satellite location information may enable the GPS receiver to accurately identify its own position. Using either the C/A or P codes, a GPS receiver may be able to achieve a 3D position fix by tracking up to four GPS satellites. While the process of tracking a GPS satellite may be quite complex, the basic idea is that the GPS receiver can estimate its position by determining the distance to each tracked GPS satellite. Because GPS signals propagate at the speed of light (c), or 299,792,458 m/s, a GPS receiver can calculate the distance from each respective GPS satellite, called the "pseudorange," by using the following equation, which shows pseudorange as a function of time interval:

$$PR_i = T_i \times c$$

The actual process of achieving position fixes information may be performed by the GPS receiver, which may decode the message data sent from each GPS satellite. With each GPS satellite broadcasting its respective unique position, the GPS receiver may be able to use the pseudorange difference between each GPS satellite to determine its exact location. Using triangulation, the GPS receiver may use three GPS satellites to achieve a 2D position fix, and four GPS satellites to achieve a 3D position fix.

The GPS simulator system may be operable to perform one or more of the following:

Selecting optimal GPS Satellites based on the sky-view inferred from the location and/or time for the GPS receiver;

Incorporating carrier frequency offset due to any Doppler effect(s);

Incorporating any chip rate changes due to the Doppler effect(s);

Performing re-sampling for two or more signals from the GPS satellites;

Scaling the two or more GPS signals according to pseudoranges, which may fix any issues from path loss;

Adding the re-sampled signals to create the composite GPS signal; this may facilitate combining of GPS signals with varying sampling rates caused by different Doppler spreads;

Generating the composite GPS signal using hardware, which may be transmitted and received by the GPS receiver to be tested;

Receiving feedback from the GPS receiver indicating the calculated location of the GPS receiver based on the composite GPS signal; and Analyzing and/or displaying results of the test of the GPS receiver.

Figure 3A:
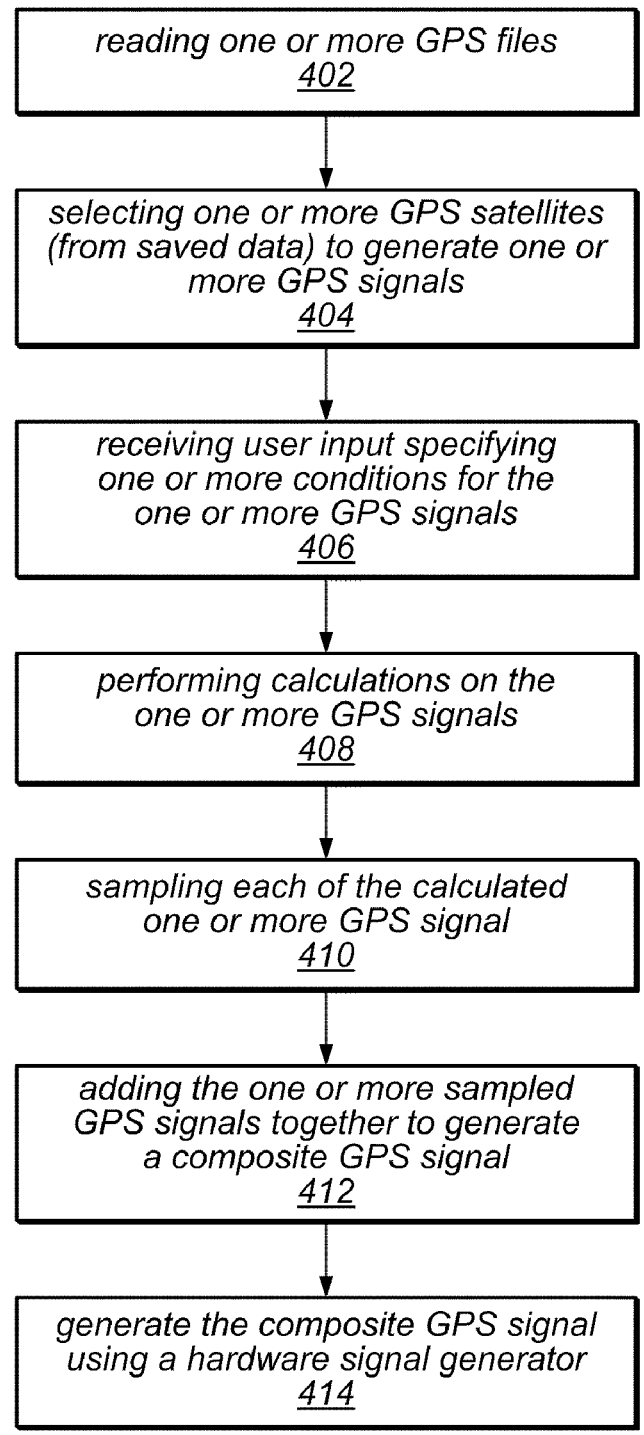
FIGS. 3A and 3B are flowchart diagrams of a method for generation of multi-satellite GPS Signals in software, according to some embodiments.

FIGS. 3A/B—Flowchart

FIGS. 3A/B illustrate exemplary method(s) for creating a graphical program to perform the simulation of the GPS signals, according to some embodiments. The exemplary embodiments shown in FIGS. 3A/B illustrate method(s) for testing the one or more GPS receivers. The method(s) shown in FIGS. 3A/B may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, the method(s) may operate as follows.

With respect to FIGS. 3A/B, in 402, the method may read one or more GPS files, according to some embodiments. Each of the one or more GPS files may contain data for a plurality of GPS satellites. The one or more GPS files may include Almanac and/or Ephemeris Files, among others. These files may contain information needed by the GPS simulator to generate correct GPS satellite signals. The GPS simulator may gather data from these publicly available almanac 402B and ephemeris files 402A that contain detailed information about the satellite locations, clocks, satellite orbital information, among others.

Because a GPS receiver uses satellite message data to obtain almanac and ephemeris information, this information is required for simulation of GPS signals as well. Almanac and Ephemeris information may be supplied as a text file, and may provide information about location, altitude, health, and orbit patterns for each GPS satellite. In addition, the waveform creation process also may allow the user to select custom parameters such as time of week (TOW), location (longitude-latitude-altitude), and simulated receiver velocity. Based on this information, the GPS Simulator may automatically select 404A up to 12 satellites, calculate any Doppler shift and pseudorange information, and produce a resulting baseband waveform.

Using custom almanac and ephemeris files, GPS signals may be created from specific dates and times, dating back several years. In general, almanac and ephemeris information is updated daily, and files from the same day should be used when choosing a specific date and time.

As mentioned above, the GPS Simulator may use user-selected almanac files 402B in a SEM file format (.al3 or .AL3). The almanac files may be available for download at the USCG Navigational Center GPS Almanac Information Web site at http://navcen.uscg.gov/gps/almanacs.htm. The GPS Simulator may also accept custom almanac file(s); however, any such custom file should conform to the SEM format.

As mentioned above, the GPS Simulator may use user-selected ephemeris files 402A in a Receiver Independent Exchange (RINEX) format. The ephemeris files are available for download at the Crustal Dynamics Data Information System (CDDIS) GNSS Data Web site at http://cddis.gfc.nasa.gov/gnss_datasum.html. The GPS Simulator may also accept custom ephemeris file(s); however, any such file should conform to the RINEX format (e.g., such as the RINEX 2.0 format).

In some embodiments, the GPS simulator system may also use a field recording GPS system, meaning that the GPS simulator system may acquire and then record the GPS signals directly from the GPS satellites. In other words, the GPS simulator system may use data acquired using the field recording GPS system. In some embodiments, a separate GPS recording system may record and send the recorded GPS data to the GPS simulator system at a later time.

In 404, the method may operate to select two or more GPS satellites out of the plurality of GPS satellites to generate one or more GPS signals, according to some embodiments. Specifically, the data for the two or more satellites may be included in the one or more GPS files. Each of the one or more GPS signals may contain data for a respective GPS satellite out of the two or more selected GPS satellites. The selection of an optimal number of GPS satellites 404A may be done based on several checks that include one or more of pseudorange check(s), Doppler frequency check(s), satellite elevation check(s), satellite health check(s), and/or fit interval check(s). The GPS satellites that pass the above checks may be taken into consideration for the generation of the composite GPS signal. As described below with reference to FIGS. 7A-D, the selection of the GPS satellites may be done manually or automatically 404A.

In 405, a GPS navigation message may be populated. As an optimal number and location of GPS satellites may be selected 404A, a navigation message may indicate a position fix for the simulated GPS receiver. Specifically, for C/A codes, the navigation message may consist of 25 frames of data, and each frame may contain 1500 bits. In addition, each frame may be divided into five 300-bit sub-frames. With a GPS receiver acquiring C/A codes, it may take approximately 6 seconds to acquire one sub-frame and thirty seconds to acquire one frame. The thirty seconds required to acquire an entire frame may have implications on some of the measurements. In fact, a "Time To First Fix" measurement (TTFF) is usually greater than thirty seconds because this is the minimum needed for a GPS receiver to acquire an entire frame.

In order to achieve a position fix, GPS receivers may use updated almanac and ephemeris information. This information may be contained in the message data transmitted by GPS satellites, and each sub-frame may contain a unique set of information. Generally, the sub-frames may be described as having the following data:

Sub-frame 1: May contain clock correction, accuracy, and health information of a respective GPS satellite;

Sub-frame 2-3: May contain the precise orbital parameters that may be used to compute the location of each GPS satellite; and Sub-frames 4-5: May contain coarse satellite orbital data, clock correction, and health information.

Figure 3B:
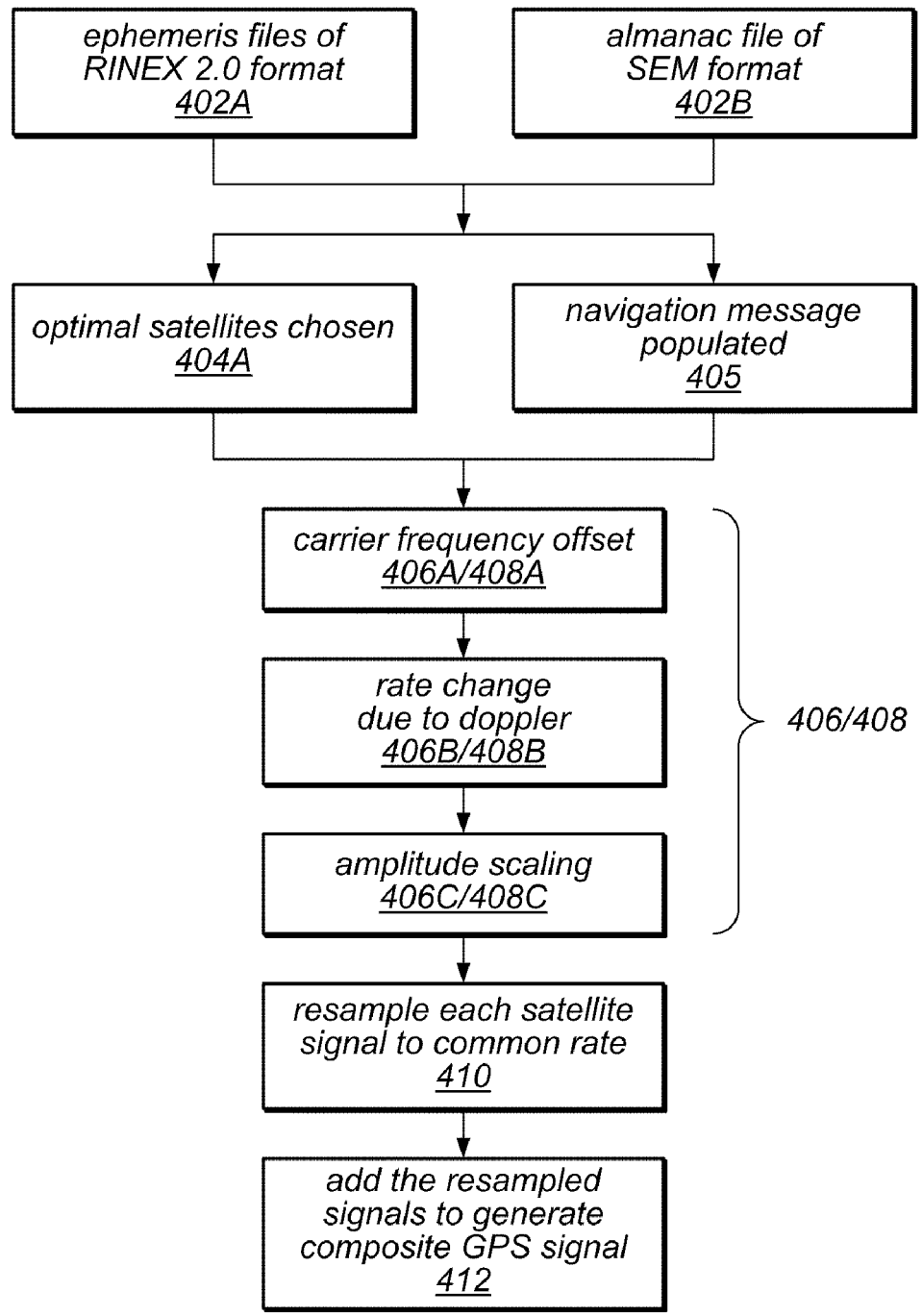

In 406, the method may receive input (e.g., user input) specifying parameters for the one or more GPS signals (e.g., elements 406A-C of FIG. 3B), according to some embodiments. For example, as described herein, the parameters include parameters for the two or more selected GPS Satellites, as well as urban canyon effects, atmospheric conditions, weather conditions, solar conditions, etc. This is described with more detail below with reference to FIGS. 7A-D.

In 408, the method may calculate two or more GPS signals using the specified parameters for the GPS receiver, according to some embodiments. The calculations may include chip rate/carrier frequency offset (e.g., elements 408A-C of FIG. 3B) such as described with reference to FIG. 5. Thus with reference to FIG. 3B, the parameters may either be received prior to calculating the two or more GPS signals, or they may be received during the respective calculations.

The GPS simulator may be operable to simulate the continuously moving GPS satellites with respect to the continuously moving GPS receiver(s). In other words, the GPS simulator may account for continuously changing Doppler effect(s) between the GPS satellites and the GPS receiver(s). Thus to model the continuously changing Doppler effect(s) as an incorporation of a frequency offset in an RF signal. However, a chip rate perceived by the GPS receiver may not be 1.023 Mcps due to Doppler effects. For example, depending on whether a respective GPS satellite is moving towards or away from the GPS receiver, the perceived chip rate may be higher or lower.

This issue may become more complicated as the calculations shift from accounting for only a single GPS satellite to using multiple GPS satellites. When using multiple GPS satellites, because of different motion trajectories of each GPS satellite, the signal from each GPS satellite may have a different carrier frequency offset and also a different perceived chip rate. Thus the signals from the multiple GPS satellites being used should not be simply added, and they should be re-sampled/re-scaled first instead. The following description will set forth the various embodiments for simulating, generating, and adding GPS signals for multiple GPS satellites.

In some embodiments, the above factors such as Doppler effects, timestamps etc., may be unique for each GPS satellite—GPS receiver pair, and thus the GPS simulator system may generate the combined GPS signal from different GPS satellites using analytical means.

In 410, the method may re-sample each of the calculated two or more GPS signals to a common rate, according to some embodiments. Since each GPS signal may be sampled at a different rate, the GPS signals cannot be simply added. The method may thus re-sample each GPS signal to a common rate so that the sampling instants of each GPS signal may be aligned. The method may continuously re-sample the two or more GPS signals. This is described in more detail with reference to FIG. 6.

In 412, the method may add the two or more re-sampled GPS signals together to generate a composite GPS signal, according to some embodiments. As the two or more GPS signals may be continuously re-sampled, the two or more GPS signals may be continuously added as well. Once the GPS signals are re-sampled, they may be added together to create a composite GPS signal. This is described in more detail with reference to FIG. 6.

In 414, the method may generate the composite GPS signal using a hardware signal generator, according to some embodiments. The composite GPS signal may be used to test the GPS receiver. This is described in more detail with reference to FIGS. 8-9. Although in some embodiments, the GPS Simulator may use multiple radio frequency (RF) outputs to generate signals for multiple GPS satellites, and thus generate a single composite GPS signal (e.g., a single RF output) for multiple GPS satellites. This ability to generate a single composite GPS signal allows the GPS Simulator to be utilized using cheaper and less complex hardware. Additionally, since software for the GPS Simulator may be executed on a computer, any updates to the software can be easily made, i.e., without replacing any hardware.

Figure 4:
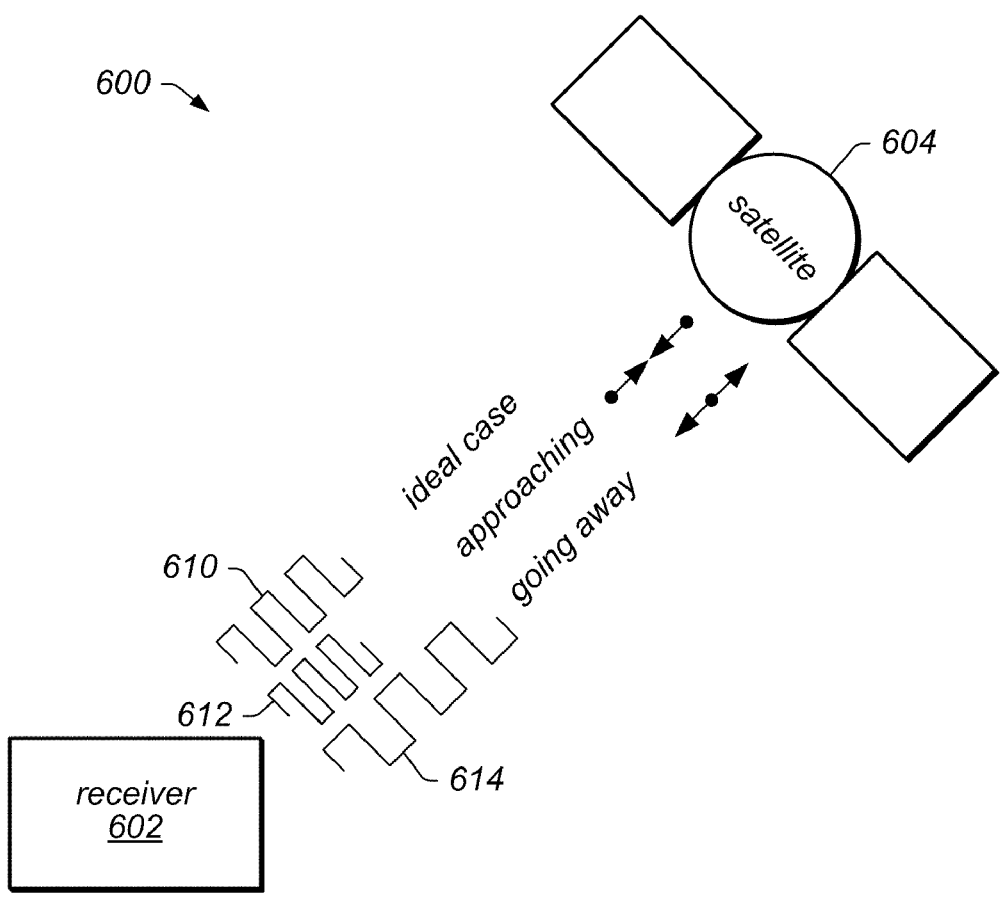
FIG. 4 is a high level block diagram illustrating signal reception rate, as a GPS satellite and a GPS receiver move with respect to each other, according to some embodiments.

FIG. 4—Chip Rate Change/Carrier Frequency Offset

FIG. 4 illustrates exemplary effects of a signal reception rate as a GPS satellite and a GPS receiver move with relation to each other.

Carrier Frequency Offset

Once a navigation message may be available (e.g., it may use chips such as by spreading the bits), the GPS simulator may begin generating complex RF data for the GPS signal(s).

This generation may include calculating a carrier frequency offset, which may be characterized as a deviation from a true carrier frequency. As mentioned above, each GPS signal from a respective GPS satellite may have an associated carrier frequency.

Because of a relative motion between each respective GPS satellite and the GPS receiver, the GPS receiver may perceive the respective received GPS signal to have a different carrier frequency. Hence the GPS simulator may introduce a carrier frequency offset into the true carrier frequency to compensate for this relative motion effect.

The method may represent a baseband signal from a $k^{th}$ GPS satellite with:

$$x^{(k)}(n^{(k)}) = x^{(k)}\left(\frac{n^{(k)}}{R^{(k)}}\right),$$

where $R^{(k)}$ may be a perceived chip rate for the $k^{th}$ GPS satellite. The method may represent the carrier frequency offset for the $k^{th}$ GPS satellite with $\Delta F^{(k)}$. Thus by incorporating the carrier frequency offset, the signal can be represented as:

$$x^{(k)}(n^{(k)}) = x^{(k)}\left(\frac{n^{(k)}}{R^{(k)}}\right)e^{j2\pi \frac{\Delta F^{(k)}}{R^{(k)}} n^{(k)}},$$

which may be used in the below calculation(s).

Chip Rate Change

FIG. 4 illustrates exemplary relative motion between a GPS satellite 604 and a GPS receiver 602. The relative motion may include motion towards or away from each other. As a result, in addition to the carrier frequency offset, the GPS receiver 602 may receive the GPS signal from the respective GPS satellite 604 at a faster rate 612 (if they are approaching each other) or at a slower rate 614 (if they are moving away from each other). Thus the GPS receiver 602 may perceive the received GPS signal to be coming at a chip rate which may be different from the value at which the signal was sent from the respective GPS satellite 604. The square waves in FIG. 4 represent exemplary chips. The GPS simulator may introduce a chip rate change to be perceived by the GPS receiver 602 that may equalize/normalize the chip rate, as described with reference to FIG. 6.

In some embodiments, the composite signal may be represented as:

$$s(n) = \sum_{k=1}^{N} x^{(k)}(n^{(k)}) = \sum_{k=1}^{N} x^{(k)}\left(\frac{n^{(k)}}{R^{(k)}}\right)e^{j2\pi \frac{\Delta F^{(k)}}{R^{(k)}} n},$$

where N is the number of satellites. Thus the perceived chip rate may be defined as:

$$R^k = \left(1 + \frac{\Delta F^k}{F_c}\right)R_n \quad (4)$$

where, $R_n$=1.023 Mcps, $F_c$=1.57542 GHz

Figure 5:
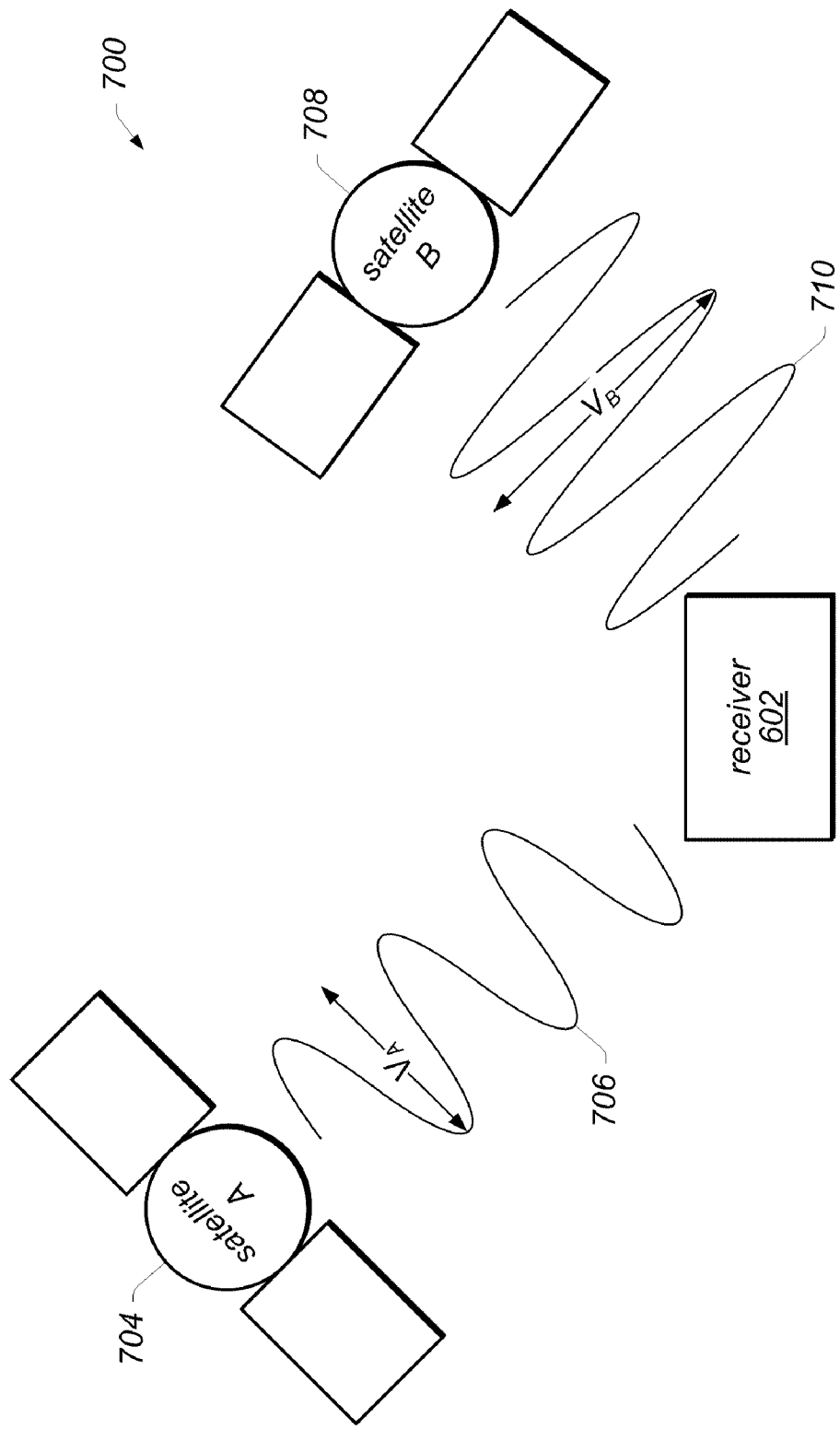
FIG. 5 is a high level block diagram illustrating a situation where radio frequency (RF) signals from two or more different GPS satellites are received by a GPS receiver, according to some embodiments.

FIG. 5—Exemplary Signal Scaling

FIG. 5 illustrates exemplary signal scaling where RF signals may be coming from multiple GPS satellites. The two exemplary GPS satellites 704 and 708 may be at different distances from the GPS receiver 602. Hence, the respective GPS signals 706 and 710 coming from the different satellites 704 and 708 may be attenuated. The power attenuation may be inversely proportion to the square of the distance. In order to simulate this, the GPS simulator may scale the signal amplitude for each GPS signal to be inversely proportional to the ratio of the pseudoranges. In FIG. 5, the sinusoids represent RF carrier signals, and the exemplary $V_A$ signal 706 may have a smaller amplitude from the $V_B$ signal 710.

Figure 6:
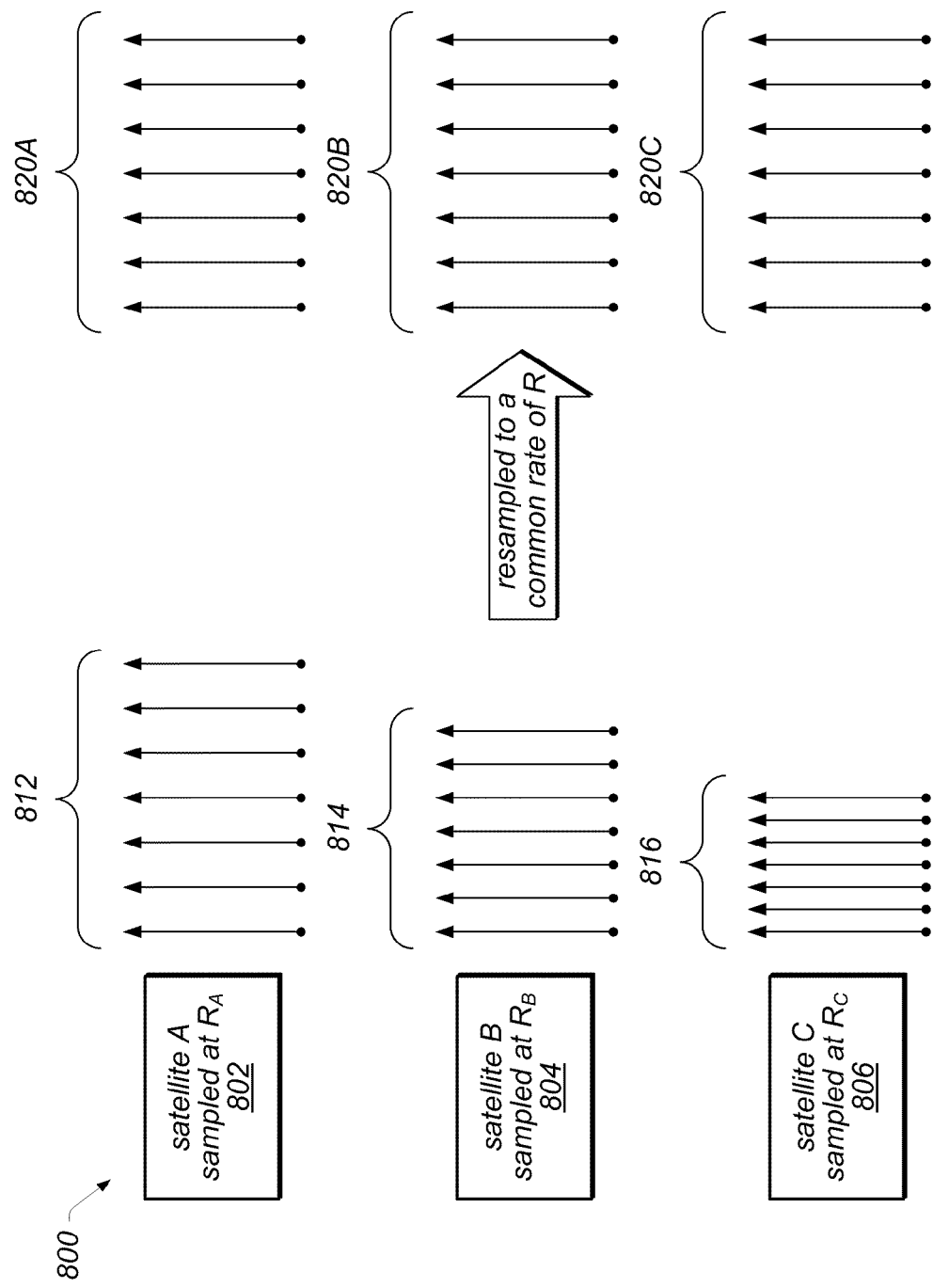
FIG. 6 is a high level block diagram illustrating how multiple GPS satellite signals are re-sampled to a common rate, according to some embodiments.

FIG. 6—Re-Sampling of Multiple GPS Satellite Signals to a Common Rate

FIG. 6 illustrates an exemplary system where GPS signals received from multiple GPS satellites are re-sampled to a common rate. FIG. 6 illustrates an exemplary system where the three GPS satellites 802, 804, and 806 are all moving relative to the GPS receiver (not shown), such as where the three GPS satellites 802, 804, and 806 are either moving towards or away from the GPS receiver 602. Furthermore, the GPS satellites 802, 804, and 806 may all be moving at different individual speeds relative to the GPS receiver 602.

In the above exemplary scenario, the GPS signals from each GPS satellite may have different carrier frequency offsets and different chip rates. The GPS simulator may generate a single composite GPS signal that can be transmitted to the GPS receiver. As mentioned above, since each GPS signal 812, 814, and 816 may be sampled at a different rate, the GPS signals 812, 814, and 816 cannot be simply added. The method may thus re-sample each GPS signal 812, 814, and 816 to a common rate so that the sampling instants of each GPS signal may be aligned; as a result, the multiple GPS signals 820A-C may be added together to create a composite GPS signal.

Hence, in order to create the composite signal received by GPS receiver, the GPS simulator may re-sample each GPS satellite signal 812, 814, and 816 to a common rate so that they can be added sample by sample at common timing instants.

The method may represent the re-sampled signal as $$x_R^k(n) = x_R^k\left(\frac{n}{R}\right).$$

Thus the composite GPS signal may be written as, $$s_R(n) = \sum_{k=1}^{N} x_R^{(k)}(n), \quad (5)$$

where the subscript R may indicate that each GPS signal has been re-sampled to a common rate of R.

FIGS. 7A-7D—Exemplary Screenshots of Displays from a GPS Simulator

FIGS. 7A-7D show exemplary screenshots of displays from an exemplary GPS Simulator. In some embodiments, the GPS Simulator may be able to simulate up to 12 GPS satellites. A user may be able to select the number of GPS satellites for the simulation, or that number may be automatically selected by the GPS Simulator depending on various factors including the user-specified files (e.g., almanac and ephemeris files), the actual GPS time, and location of the GPS receiver. The GPS Simulator may be able to validate several parameters of the GPS satellites before the simulation begins, including the following GPS satellite parameters:

Valid Doppler value;
Valid pseudorange;
Good health of the satellite;
Known fit interval; and/or
Satellite elevation angle.

In some embodiments, if the parameters of the GPS satellites are valid at the specified GPS time, that GPS satellite may be selected and used to simulate a GPS signal.

Thus the GPS Simulator may collect GPS satellite information based on the user-defined almanac and ephemeris files. When this information is available, the GPS Simulator may continuously update any Doppler shifts between the GPS satellites and the simulated GPS receiver so that the simulated GPS signal indicates a location as close to the real location as possible. In some embodiments, once a composite GPS signal is generated, the GPS receiver may be used in place of the simulated GPS receiver, such that the GPS simulator may verify the calculated GPS position by the GPS receiver (i.e., the GPS receiver under test) with the anticipated location as set by the simulated GPS receiver.

Output File

The GPS data may be created and stored in an output binary file, although other output formats are contemplated. The user may provide a name and location for the file that will be created by the GPS Simulator. However, the GPS simulator may be able to save the file automatically.

Mode of Operation

The GPS Simulator may support two or more modes, including a manual mode and an automatic mode, although other modes, such as a semi-automatic mode, are contemplated.

Figure 12:
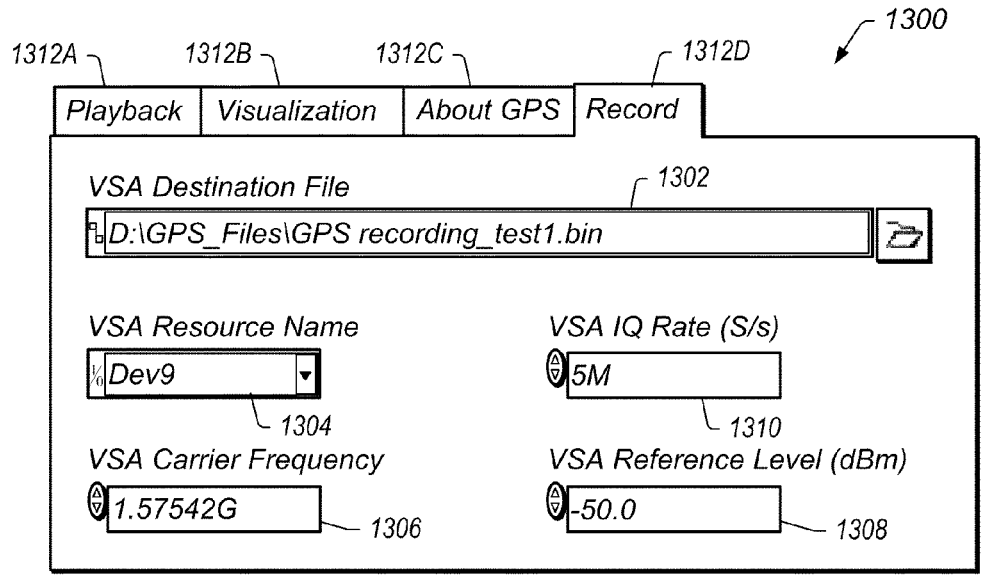
FIG. 12 is an exemplary screenshot of a front panel of software for recording and playback of radio frequency signals, according to some embodiments.

While most GPS simulation use cases can be covered using the toolkit in "automatic mode," where Doppler and pseudo-range information is programmatically calculated, it can also be used in manual mode as well. In manual mode, however the user can specify each satellite's information independently. FIG. 12 illustrates exemplary available input parameters for both modes of operation.

In some embodiments, the GPS time of week may be automatically set by the GPS Simulator to a range of possible values specified by the ephemeris file. Thus if a value is chosen that is out of range of the given ephemeris file, the GPS Simulator may be able to automatically chose the next-closest possible value; the GPS Simulator may also report a warning to the user.

Figure 7A:
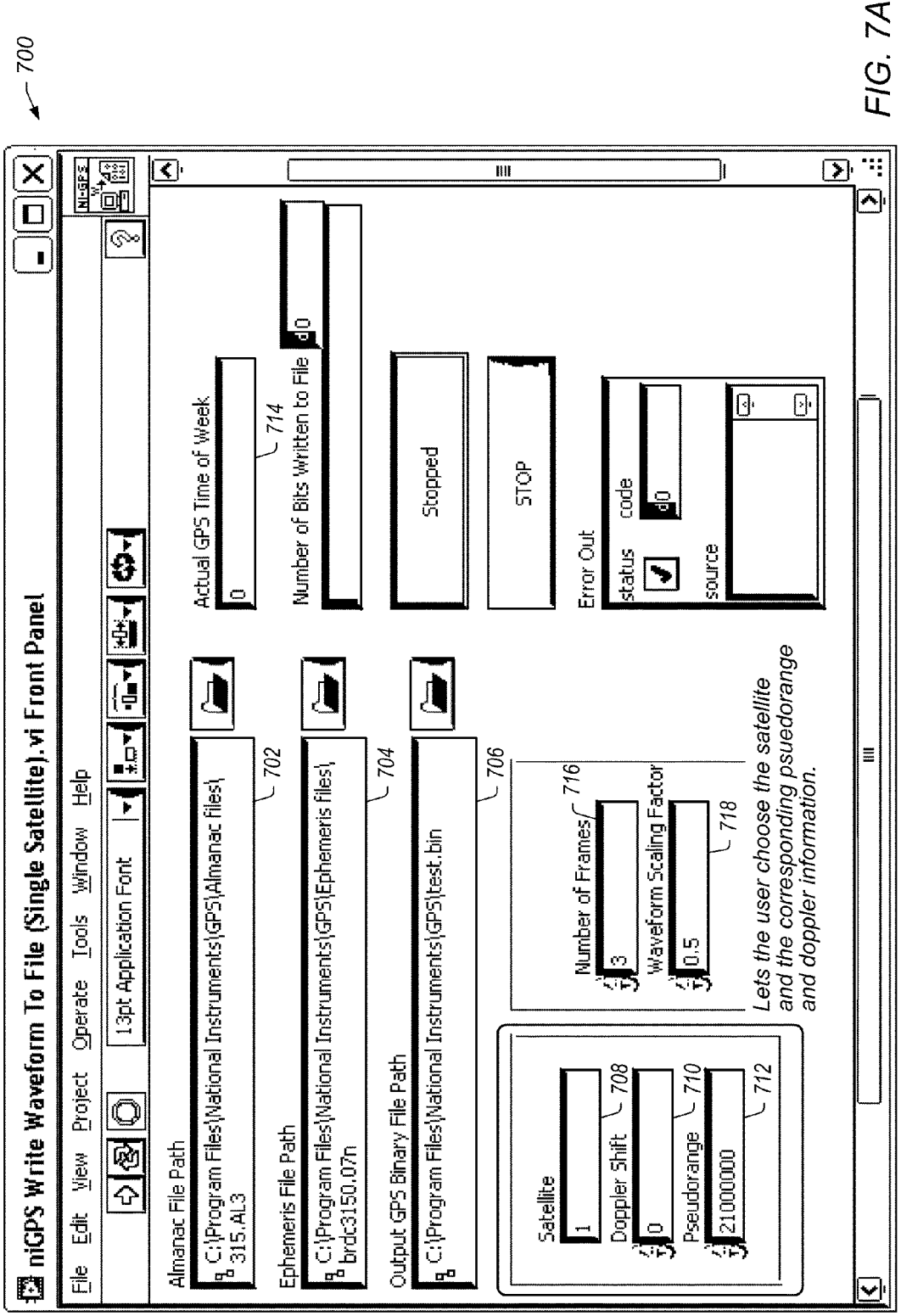
FIG. 7A is an exemplary screenshot of a front panel of a graphical program for creating GPS data for a single GPS satellite, according to some embodiments.

Manual Mode: The Manual mode is geared towards letting a user select two or more GPS satellites for simulation and some of their parameters, such as relative power level of each GPS satellite. An exemplary screenshot of a software front panel implementing a selection of one GPS satellite along with some user-selectable parameters is shown in FIG. 7A. As illustrated by FIG. 7A, the user may select a path location for one or more of an Almanac File 702, an Ephermis File 704, and an output file 706. The user may also select one or more of the GPS satellites 708, and a corresponding Doppler Shift 710 and/or the pseudorange 712, time of week (TOW) 714, location, and simulated receiver velocity, among other parameters.

Figure 7B:
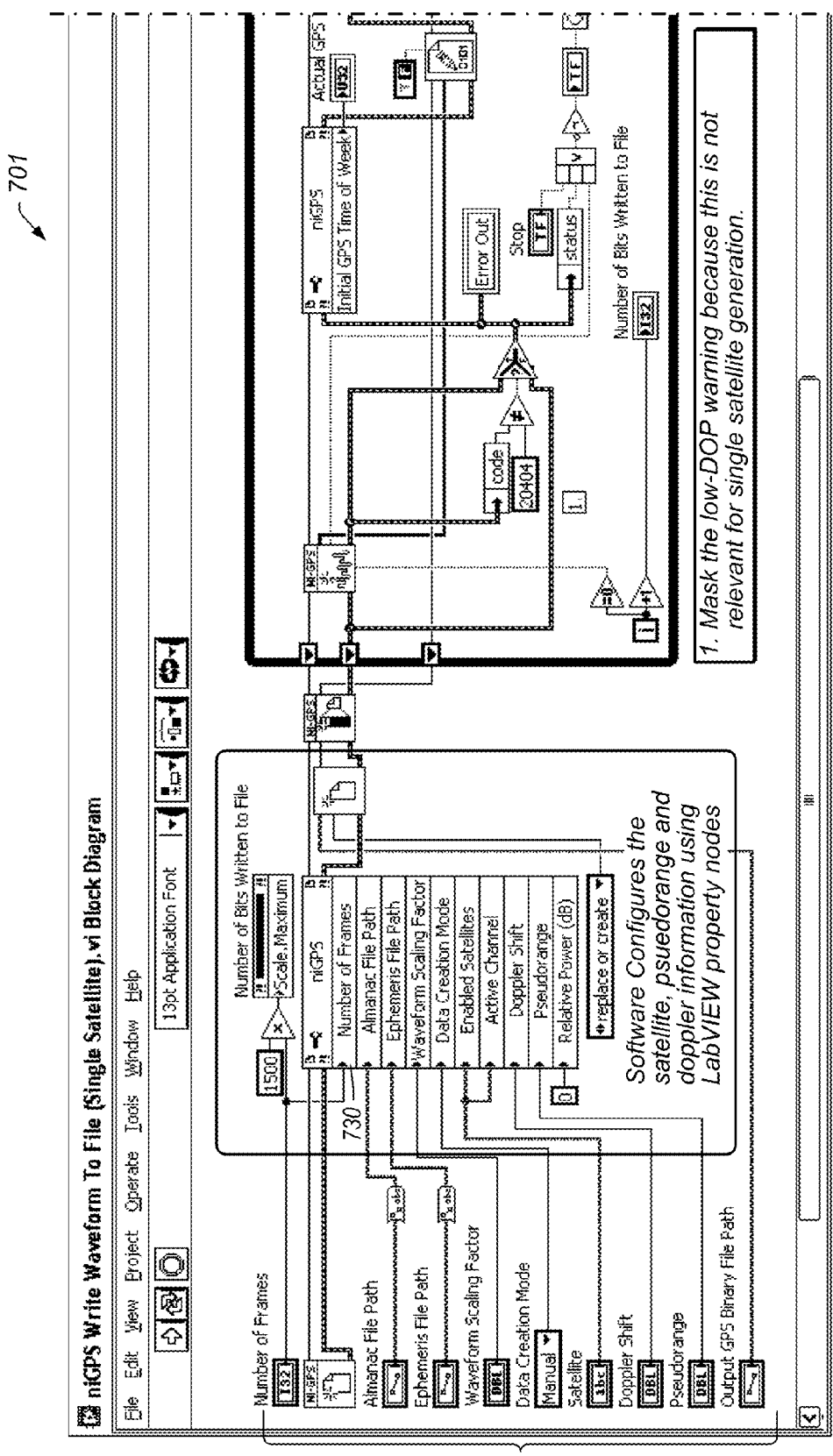
FIG. 7B is an exemplary screenshot of a block diagram of a graphical program for creating GPS data for a GPS satellite, such as using manual mode, according to some embodiments.

FIG. 7B illustrates an exemplary block diagram 701 for a graphical program for accessing various GPS files and for generating the GPS data for a user-selectable single GPS satellite. It is noted that this graphical program block diagram can be easily adopted for use with multiple GPS satellites. In some embodiments, the created GPS data may be saved at the location specified by the output file path. The created GPS data may also be saved and/or stored on a computer/storage location on a network. The exemplary block diagram 701 may include one or more blocks 730 that may operate to implement most of the methods described in FIGS. 3A-B. The block(s) 730 in the exemplary block diagram 701 may accept one or more inputs 732 such as a number of frames, file path(s), Doppler shifts, among others.

In some embodiments, the manual mode does not guarantee a position fix on a GPS receiver under test since the user selected parameters may not be crosschecked. In some embodiments, the manual mode may guarantee a position fix on the GPS receiver under test, such as by crosschecking the user selected parameters for the one or more selected GPS satellites and the simulated GPS receiver. For example, there may be a user-selectable option that enables/disables crosschecking of the user-selected parameters when using the manual mode.

Automatic Mode: The Automatic mode is geared towards creating GPS data that is capable of achieving a position fix for the GPS receiver under test. In this mode, based on the almanac and ephemeris information read from one or more GPS files (or somehow provided by the user), the GPS simulator may select an optimal number and location of GPS satellites that may yield a desirable navigation solution (e.g., a position fix for the simulated GPS receiver). The number of optimal GPS satellites may be three, four, or as many as 12, depending on the location of the GPS satellites, the location of the GPS receiver, and the values of the various parameters and/or other factors. The GPS simulator may also perform several checks for the validity of the GPS satellite data, pseudoranges, Doppler effects, health of the one or more GPS satellites, among others, before deciding to use a GPS satellite in the simulation.

Figure 7C:
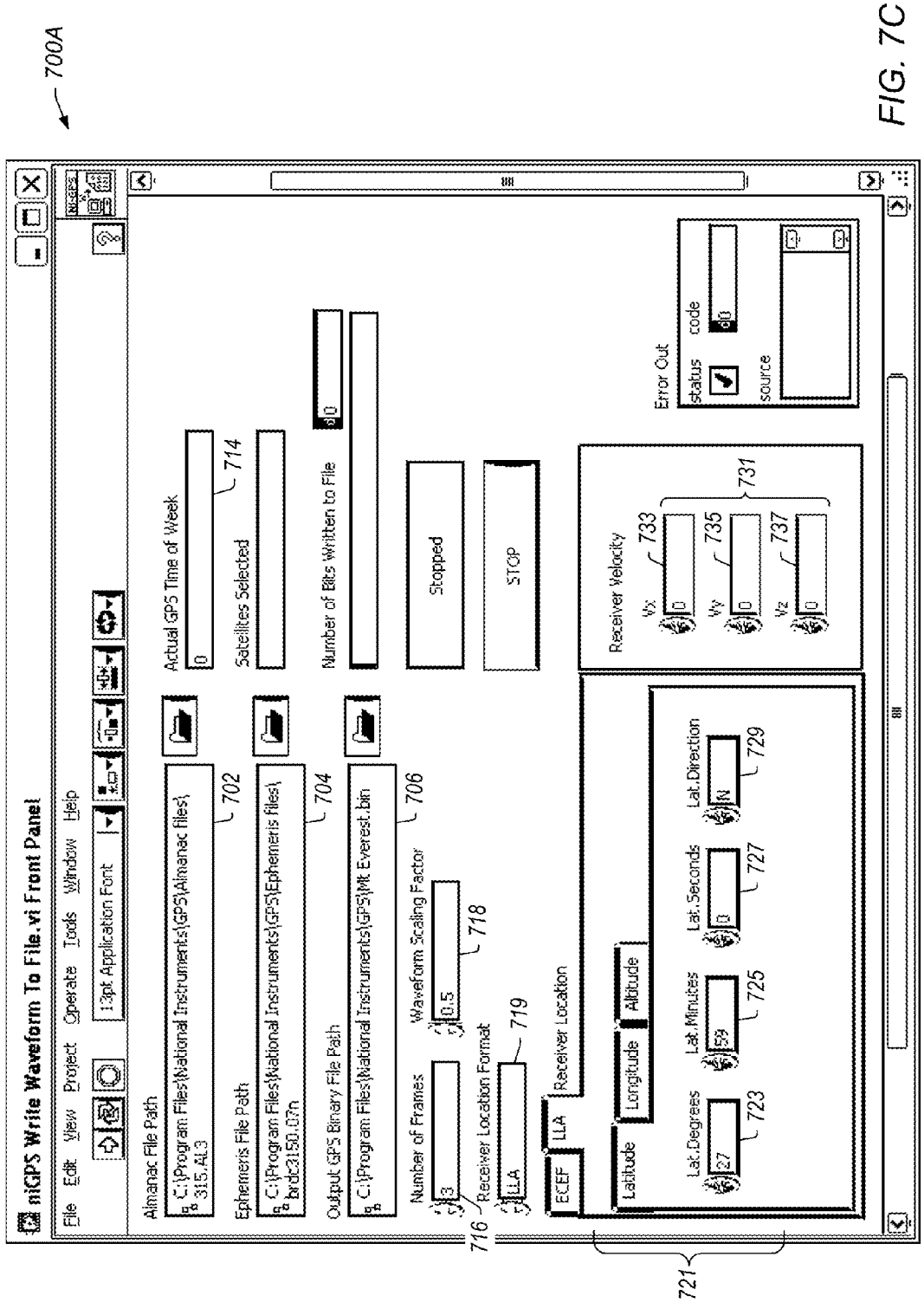
FIG. 7C is an exemplary screenshot of a front panel of software for creating GPS data using automatic mode, according to some embodiments.

FIG. 7C illustrates a screenshot of the software front panel 700A for using the automatic mode. The user may select a path location for one or more of an Almanac File 702, an Ephermis File 704, and/or an output file 706. The user may also select one or more of the GPS satellites 708, and a corresponding Doppler Shift 710 and/or the pseudorange 712, time of week (TOW) 714, location (longitude-latitude-altitude) (elements 721, 723, 725, 727, and 729 of FIG. 7C), and simulated receiver velocity (elements 731, 733, 735, and 737 of FIG. 7C), among other parameters.

Thus the GPS Simulator software may create the GPS data in response to user selection of a location 721 of the simulated GPS receiver. This location may be provided either in Earth Centered Earth Fixed (ECEF) or Latitude Longitude Altitude (LLA) mode. The GPS Simulator software then may select the GPS satellites while making sure the correct GPS simulation data is created. The created GPS data may be stored in memory and/or saved in a file, such as a binary waveform file. In some embodiments, the created GPS data may be saved at the location specified by the output file path. The created GPS data may also be saved and/or stored on a computer/storage location on a network.

In some embodiments, the GPS Simulator may also offer a semi-automatic mode, which may be a combination of the manual and automatic modes described above. In the semi-automatic mode, the software for the GPS Simulator may suggest some of the settings such as which GPS satellites to use. However, the user may also have a way to override the suggested selections. In the semi-automatic mode, the user may still be able to select crosschecking the user-selected parameters as described above. In some embodiments, the automatic mode described above may exhibit some of the features of the semi-automatic mode, such as ability for the user to override some of the automatically selected settings.

Figure 7D:
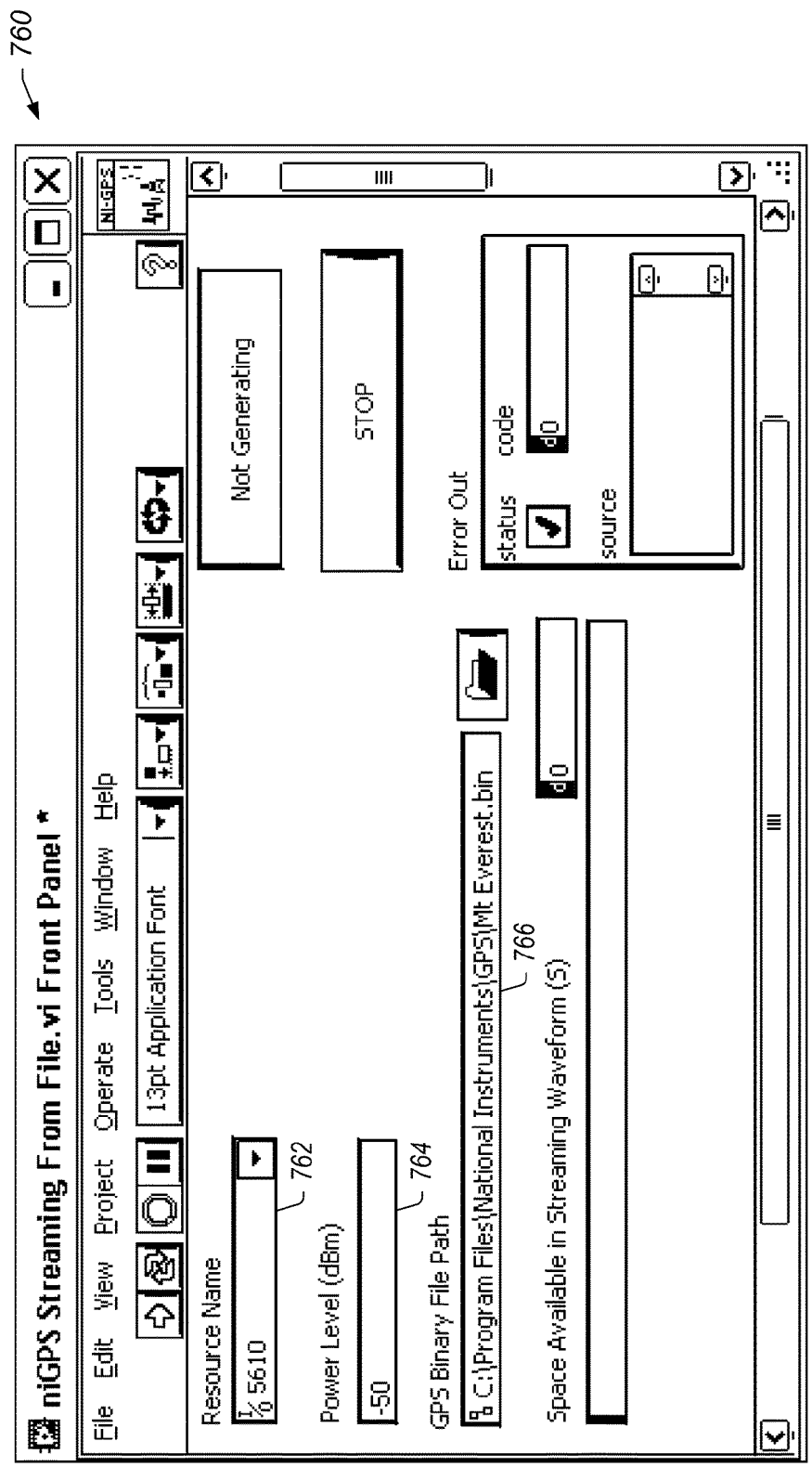
FIG. 7D is an exemplary screenshot of a front panel of software for generating a GPS signal using stored GPS data, according to some embodiments.

FIG. 7D shows an exemplary screenshot 760 of starting of a test of a GPS receiver. Furthermore, since the GPS Simulator may contain most or all of the solution entirely in software, it can be easily scaled to incorporate additional features including transparency to users to tweak and customize the software, urban canyon effects, tropospheric/ionospheric effects, solar activity and weather related impairments, easy upgrades if a signal format of the GPS satellites change or to accommodate new GPS satellite constellations, as well as easy increase of the number of simulated GPS satellites. The GPS Simulator may accept input 766 specifying one or more files with the simulated GPS signals. The GPS Simulator may accept input 762 specifying a resource, such as a hardware RF generator, and a power level 764 for testing the GPS receiver.

Figure 8:
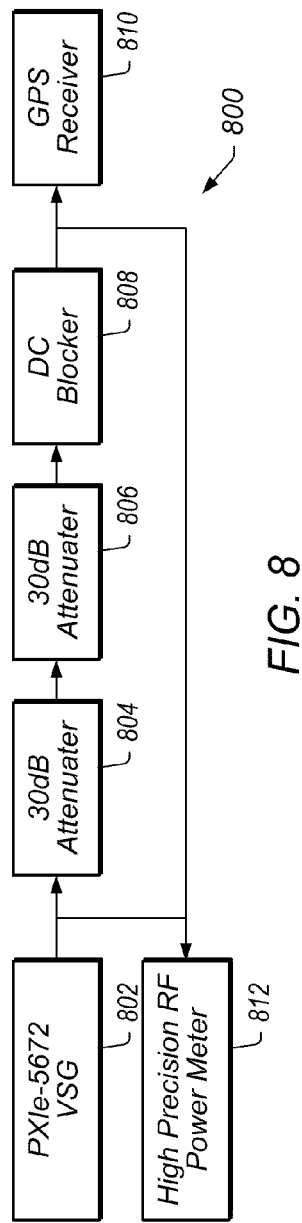
FIG. 8 is a high level block diagram of a GPS signal generation system, according to some embodiments.

FIG. 8—Exemplary GPS Simulator System

FIG. 8 illustrates an exemplary GPS Simulator system, according to some embodiments. The GPS Simulator system 800 for testing a GPS receiver may include an RF vector signal generator 802 capable of simulating GPS signals.

In some embodiments, a vector signal generator 802 may be used to generate simulated GPS signals, such as National Instruments PXI-5671 and PXIe-5672 RF vector signal generators (VSG). Thus the VSG 802 may be combined with GPS Simulator software to generate GPS signals for 1 to 12 simultaneous GPS satellites. The design of a complete GPS measurement system may also use various other accessories, such as external fixed attenuators 804 and/or 806 for improving power accuracy and noise floor performance. In addition, a DC blocker 808 may be used by some GPS receivers, depending on whether the GPS receiver supplies a DC bias to its direct input port. An exemplary system for a GPS signal simulator is shown in FIG. 9.

In some embodiments, up to 60 dB of external RF attenuation 804 and/or 806 (padding) may be used when testing GPS receivers. Fixed attenuators may provide the measurement system with at least two benefits. First, they may help with keeping a noise floor of the test stimulus below a thermal noise floor (−174 dBm/Hz). Second, they may improve the power accuracy, as a signal level can be calibrated with a high-precision RF power meter 812. While only 20 dB of attenuation may be used to meet the noise floor goal, a better power accuracy and noise floor performance may be met using 60 to 70 dB of attenuation.

In some embodiments, RF power calibration may be used to find a desired attenuation level. Attenuation may be used to attenuate noise, but usually not below the thermal noise floor of −174 dBm/Hz.

Figure 9:
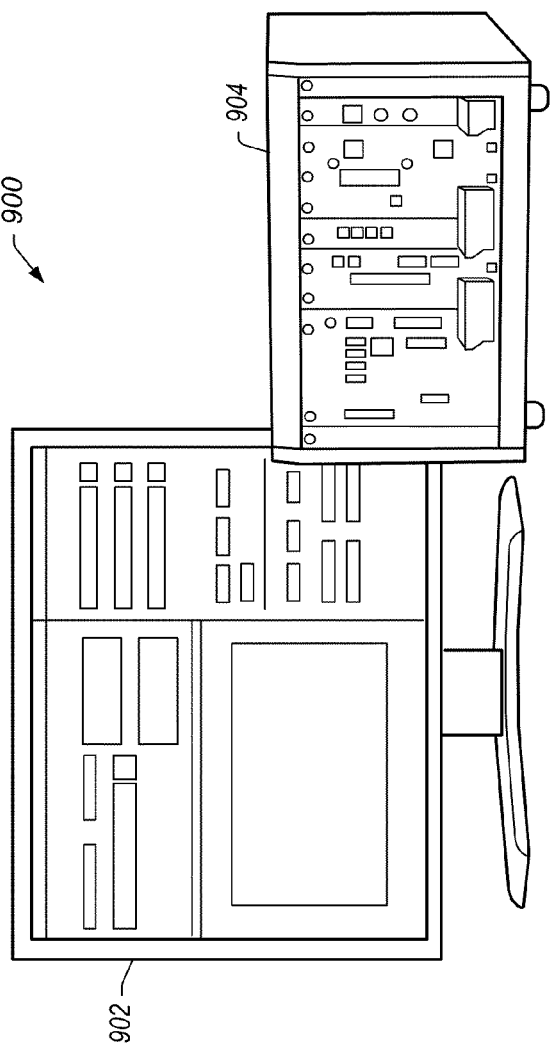
FIG. 9 is a diagram of a GPS signal generation system, according to some embodiments.

FIG. 9—A GPS Signal Generation System

FIG. 9 illustrates an exemplary GPS Signal generation system that includes an RF Vector Signal Generator (VSG). Some VSGs may be capable of generating GPS signals, have a high-speed PCI Express data bus, and offer on-the-fly IF equalization. Additionally, a VSG may be able to stream GPS waveforms, such as sampled at 1.5 MS/s (IQ) from disk at a total data rate of 6 MB/s. A VSG may be able to sustain this data rate when streaming from a hard drive. The GPS Signal generation system 900 may be executed on a computer system 904 and may use a display 902 for displaying graphical programs, front panels, configuration boxes, and/or results of GPS signal configuration, recording, and/or generation. The computer system 904 may include one or more VSG's, Signal Vector Analyzers, as well as hard drives, among others. In some embodiments, one or more of these devices may be distributed over one or more computers on a network.

In some embodiments, a GPS Simulator may be capable of creating waveforms that are up to 12.5 minutes (25 frames) in length, which is the duration of an entire navigation message. In some embodiments, the GPS Simulator may be capable of creating waveforms having enough length for multiple navigation messages.

Due to a possible large size of the files, waveforms may be stored on one of one or more built-in, external, and/or network hard drives. Furthermore, the GPS Simulator may be able to use one or more of the various other forms of storage instead of, or in addition to, the hard drive(s), such as flash memory, tape(s), CD/DVD's, and other permanent as well as temporary storage. Waveform storage sources include hard drives, external RAID volumes, external USB hard disk, and others capable of supporting continuous data streaming. Thus, any of these options may enable simulation, record, and playback of GPS signals, as a combination of simulated and recorded GPS waveforms may be used for comprehensive characterization of GPS receiver performance.

Figures 10A, 10B:
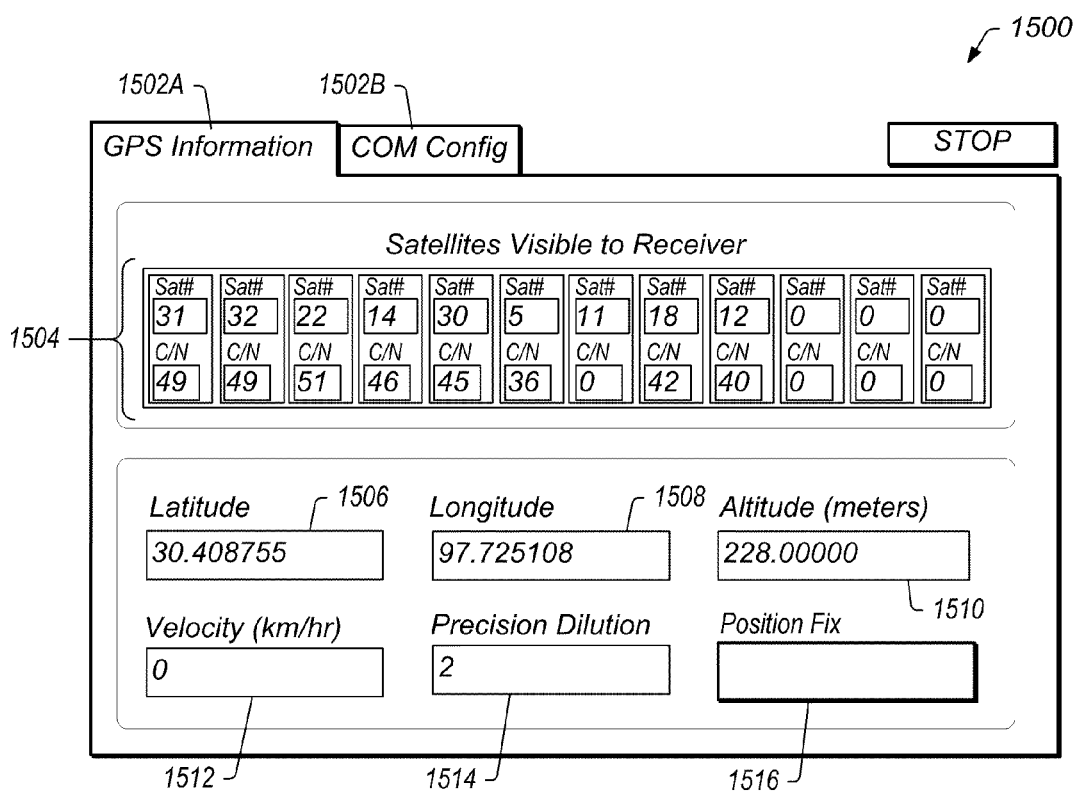
FIG. 10A is a table showing basic NMEA-183 commands, according to some embodiments.
FIG. 10B is an exemplary screenshot of a front panel of software for using NMEA-183 commands, according to some embodiments.

FIGS. 10A/B—Overview of Basic NMEA-183 Commands

FIG. 10A shows some basic NMEA-183 commands that may be used to interface with a GPS receiver that is being tested. While many GPS receivers may use proprietary software that enables the user to visualize information such as longitude and latitude, a more standardized approach may be used for automated measurements. Fortunately, a wide variety of receivers can be configured to talk to a measurement system (i.e., the GPS Simulator) controller through a protocol known as NMEA-183. In this case, the GPS receiver may send commands through either a serial or USB cable. The GPS Simulator may be operable to parse commands to return GPS satellite and position fix information. The NMEA-183 protocol supports six basic commands, and each provides unique information, as shown in FIG. 10A.

For practical testing purposes, the GGA, GSA, and GSV commands (of the NMEA-183 protocol) are the most useful. More specifically, information from the GSA command may be used to determine whether the GPS receiver as achieved a position fix and is used in TTFF (time to first fix) measurements. When performing sensitivity measurements, the GPS Simulator may use the GSV command to return C/N (carrier-to-noise) ratios for each GPS satellite that is being tracked.

FIG. 10B shows an exemplary front panel 1500 for communicating with a GPS receiver using NMEA commands. For example, the GPS Simulator may be able to read one or both of GPS information 1502A and COM configuration 1502B from a GPS receiver that may be tested using the methods described herein. The GPS information 1502 may include latitude 1512, longitude 1508, altitude 1510, velocity 1512, dilution 1514, the number and C/N of GPS satellites 1504, and a graphical indicator indicating whether a position fix has been found (e.g., using a green for yes, red for no), but other information may be read and/or analyzed as desired.

Figure 11A:
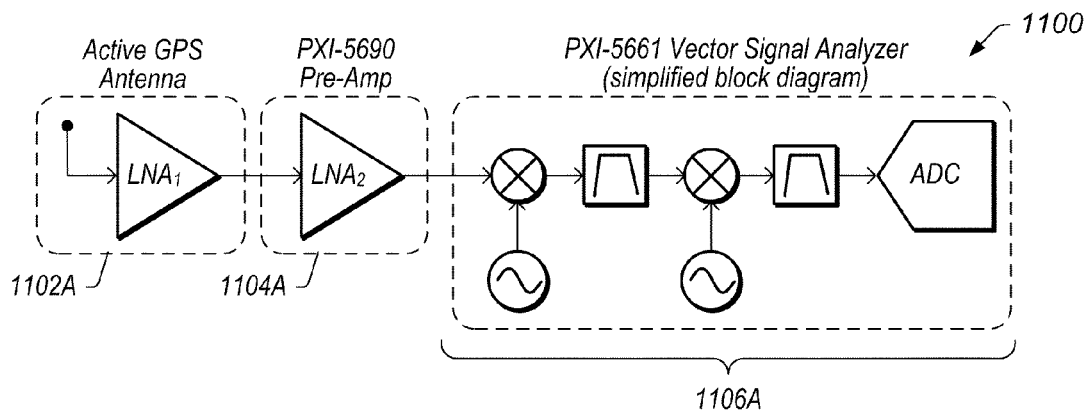
FIGS. 11A/B are high level block diagrams of exemplary systems for recording GPS Signals, according to some embodiments.

FIGS. 11A/B—Exemplary Systems for Recording GPS Signals

FIGS. 11A/B are high level block diagrams of exemplary systems for recording GPS signals. The GPS Simulator may use either the created GPS data (as described above) or it may use previously recorded physical data from a physical GPS receiver. In other words, the GPS recording system 1100 may record physical data from the one or more GPS satellites in real time, such as to memory and/or storage (e.g., hard drive).

The GPS recording system 1100 may thus use a GPS receiver to record physical data from the multiple GPS satellites as it executes, such as to find its own GPS coordinates. The physical GPS receiver and/or another instrument may also record the GPS time, position, speed, acceleration, among other parameters, of the physical GPS receiver, along with any other data such as weather patterns and other environmental data. As a result, the recorded physical data may be used with conjunction with the playback system of the GPS Simulator to test other GPS receivers. In addition, both the physical GPS data and the simulated GPS data may be used to test other GPS receivers in order to more fully simulate various conditions.

In some embodiments, the GPS waveform signals may be created by recording them directly from GPS satellites. In this scenario, the GPS signals may be recorded using a vector signal analyzer (VSA), such as the NI PXI 5661 VSA, and the recorded data may be generated and transmitted to the GPS receiver using a vector signal generator (VSG), such as the NI PXIe-5672 VSG. Since recording GPS signals usually captures real-world signal impairments, signal playback allows testing of the GPS receiver using real environmental conditions.

GPS signals may be recorded off of the air in a fairly straightforward manner. The maximum recording duration of a GPS signal may be dependent on the sample rate and the maximum storage capacity. In a GPS recording system 1100, such as the recording system of FIGS. 11A/B, appropriate GPS antennas 1102A/B and amplifiers 104A/B may be combined with a vector signal analyzer 1106A/B and hard disk(s) to capture up to several hours of continuous data. For example, a 2 TB RAID (redundant array of inexpensive disks) may be capable of recording up to 25 hours of GPS waveforms.

In some embodiments, each type of wireless communications signal, e.g., each GPS signal, may have different requirements on bandwidth, center frequency, and/or required gain. For example, a GPS signal may be recorded using 2.046 MHz of RF bandwidth at a center frequency of 1.57542 GHz. Based on the bandwidth requirements, the sample rate may be at least 2.5 MS/s (1.25×2 MHz), where the exemplary 1.25 multiplier is based on a filter roll-off of a PXI-5661 DDC (digital down converter) at the decimation stage, although values for the multiplier may be used. In the tests described below, a sample rate of 5 MS/s (20 MB/s) was used for capturing the entire bandwidth. Because data rates of 20 MB/s or more can be achieved with standard PXI controller hard drives, it may not be necessary to use an external RAID volume to stream GPS signals to disk. However, an external hard drive may be used to increase overall storage capacity and record multiple GPS waveforms.

In some embodiments, the GPS recording system may use a passive or active antenna 1102A/B and one or two LNAs 1106A/B (low noise amplifiers) for recording GPS signals. A typical passive patch antenna 1102A/B may have a peak power range in the L1 GPS band from −120 to −110 dBm. As power level of GPS signals may be small, amplification may be used to ensure that the vector signal analyzer can capture the full dynamic range of the satellite signals. While there are several ways to apply the appropriate level of gain to the signal, an exemplary system may use an active GPS antenna 1102A/B in conjunction with an NI PXI-5690 pre-amplifier 1104A. With two cascaded LNA's each providing 30 dB of gain, the total gain applied may be 60 dB (30+30). Thus, the resulting peak power observed by the vector signal analyzer 1104A may be increased from −116 dBm to −56 dBm.

The GPS recording system 1100 may also use an active GPS antenna, which may combine a patch antenna and an LNA into a single package. These antennas may use a DC bias voltage of 2.5V to 5V and can be easily purchased as an off the shelf product. For simplicity, an active GPS antenna with an SMA connector may be used. A low noise figure of a first LNA in an RF front may ensure that the recording instrumentation adds as little noise as possible to the off-the-air GPS signal.

An exemplary Vector Signal Analyzer (VSA) may have three-stage super-heterodyne operable to measure the peak power in the L1 at about −60 to −50 dBm for 60 dB applied to the off-the-air signal. The exemplary VSA may be configured in a swept spectrum mode to analyze the entire spectrum, i.e., power in bands outside the L1 band (FM and cellular) at power levels that may be higher than the GPS signal. However, the peak power of out-of-band signals may not typically exceed −20 dBm, and may be filtered by one of the VSA's several bandpass filters.

GPS Measurement Techniques

While a wide variety of measurements can be use to characterize the performance of a GPS receiver, several common measurements apply to all GPS receivers, including sensitivity, time to first fix (TTFF), position accuracy/repeatability, and position tracking uncertainty. It should be noted that there are many different methods that can be used to validate position accuracy and perform functional test(s) for GPS receiver tracking ability. While the following describes several basic methods, other methods may be used in addition to, or instead of, the ones described herein.

Introduction to Sensitivity Measurements

Sensitivity is one of the most important measurements of a GPS receiver's capability. In fact, for many commercial-grade GPS receivers, it may be the only RF measurement performed in production test of the final product. At a high level, the sensitivity measurement defines the lowest GPS satellite power level at which a GPS receiver is still able to track and achieve a position fix on the GPS satellites overhead. A GPS receiver may apply significant gain through several cascaded LNAs to amplify a GPS signal to the appropriate power level. Unfortunately, while an LNA increases signal power, it may also degrade Signal-to-Noise ratio (SNR). Thus, as the RF power levels of a GPS signal decreases, SNR may also decrease and eventually the GPS receiver may have a hard time tracking the respective GPS satellite.

A GPS receiver may be characterized by two sensitivity values, acquisition sensitivity and signal tracking sensitivity. As the names suggest, acquisition sensitivity may represent the lowest power level at which a GPS receiver may be able to achieve a position fix. By contrast, signal tracking sensitivity may indicate the lowest power level at which a GPS receiver may be able to track an individual GPS satellite.

Sensitivity can be defined as the lowest power level at which a GPS receiver may produce a desired minimum bit error rate (BER). Because BER may be correlated with carrier-to-noise (C/N) ratio, sensitivity may be measured by measuring the C/N ratio reported by the receiver at a known input power level. The C/N ratios for each GPS satellite may be directly reported by the GPS receiver chipset. This value may be calculated through a number of mechanisms, and some GPS receivers may actually approximate it by calculating a BER of the message date. Modern GPS receivers may typically report a peak C/N in the range of 54 to 56 dB-Hz when stimulated with a high-power test stimulus.

The C/N limit is fitting because even with a clear view of the sky, a GPS receiver may report C/N values ranging from 30 to 50 dB-Hz. For typical GPS receivers, the minimum C/N ratio required to achieve a position fix (acquisition sensitivity) may range on the order of 28 to 32 dB-Hz. Thus, for a particular GPS receiver, sensitivity may be defined as the minimum power level required for the receiver to produce the minimum position fix C/N ratio.

In theory, sensitivity may be measured with either a single GPS satellite or multi GPS satellite test stimulus. In practice, this measurement may be performed with a single GPS satellite test, because RF power can be more easily and more reliably determined. By definition, sensitivity may be the lowest power level at which a GPS receiver returns a desired minimum C/N (carrier-to-noise) ratio. As discussed below, a GPS receiver's sensitivity may be dependent on the noise figure of the RF front end. The sensitivity may be related to the noise figure of the GPS receiver according to the following equation:

$$\text{Sensitivity}_{min} = -174 \text{ dBm/Hz} + C/N_{min} + F_{receiver}$$

In the above equation, sensitivity may be expressed as a function of both C/N ratio and noise figure. As an example, if a minimum C/N required for position tracking is 32 dB-Hz, a GPS receiver with a noise figure of 2 dB may have a sensitivity of −140 dBm (−174+32+2). However, when testing the baseband transceiver alone, the first LNA 1102A may be bypassed.

Figure 11B:
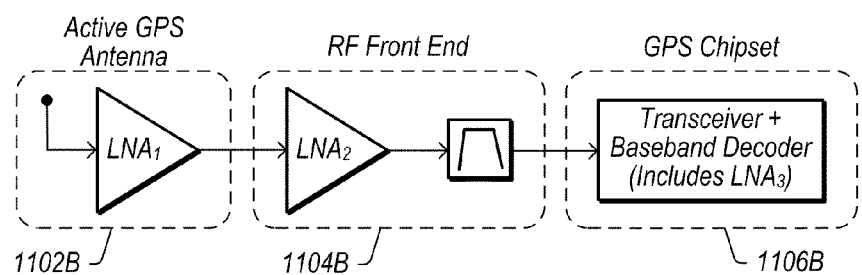

As shown in FIGS. 11A/B, a typical GPS receiver may cascade several LNA's to provide sufficient gain to the GPS signal. As discussed, the first LNA 1102A may dominate the noise figure for the entire system. In FIG. 11B, a first LNA 1102B may have a gain of 30 dB and a NF of 1.5 dB. In addition, the entire RF front end may have a gain of 40 dB and a NF of 5 dB. Because the noise power after the second LNA 1104B may exceed thermal noise of −174 dBm/Hz, the bandpass filter may attenuate both signal and noise. As a result, it may have little effect on SNR of the signal. Finally, an exemplary GPS chipset may produce a gain of 40 dB with a noise figure of 5 dB.

According to the calculations above, the overall noise factor for the GPS receiver may be equal to:

$$nf_{receiver} = 1.4125 + \frac{3.1623 - 1}{10000}$$
$$= 1.4125 + 0.0002163$$
$$= 1.4127$$

$$NF_{dB} = 10 \times \log_{10}(nf)$$
$$= 10 \times \log_{10}(1.4127)$$
$$= 1.501 \text{ dB}$$

From the above equations, an exemplary GPS receiver with an active antenna connected may have a noise figure of approximately 1.5 dB. In some embodiments, the third term in the cascaded noise figure equation may be ignored as its value is small compared to the others.

In some cases, a GPS receiver may use an active antenna with a built-in LNA. Thus, the test point may bypass the first LNA 1102B of the GPS receiver. In this case, the noise figure may be dominated by the second LNA 1102B, which may have a greater noise figure than that of the first. If the first LNA 1102B is eliminated, the noise figure may be calculated from the second LNA 1104B looking into the GPS receiver with the following equation:

$$nf_{receiver} = 3.1623 + \frac{3.1623 - 1}{10000}$$
$$= 3.1623 + 0.0002163$$
$$= 3.1625$$

$$NF_{dB} = 10 \times \log_{10}(nf)$$
$$= 10 \times \log_{10}(3.1625)$$
$$= 5.0003 \text{ dB}$$

As the above equations illustrate, removing the LNA with the best noise figure may significantly affect the noise figure for the GPS receiver.

Single-Satellite Sensitivity Measurement

In a typical test system, a simulated L1 single GPS satellite carrier may be fed into the RF port of the DUT through a direct connection. To report the C/N ratio, the GPS Simulator may communicate with the GPS receiver using a NMEA-183 protocol, such as by reading the maximum reported satellite C/N from parsing GSV commands. According to the GPS specification documents, the power of a single L1 GPS satellite should be no less than −130 dBm at the Earth's surface.

However, since many GPS receivers may be used indoors or in urban environments, the typical test limits are lower. In fact, many GPS receivers report position tracking sensitivity down to −142 dBm and signal tracking down to −160 dBm. Since GPS receivers may be able to maintain lock of a signal 6 dB below the typical operating point very quickly, a test stimulus with an average RF power level of −136 dBm may be used to simulate these urban conditions. For better power accuracy and noise floor performance, external attenuation may be used at the output of the RF vector signal generator.

In most scenarios, 40 dB to 60 dB of external attenuation may be sufficient to operate the GPS Simulator in a linear region. In some embodiments, because the fix attenuation of each pad may contain some uncertainty, the GPS Simulator system may be first calibrated to determine the power of the test stimulus. The calibration phase may account for signal peak-to-average ratio, part-to-part variation of attenuators, and/or insertion loss of any cabling used.

Multi-Satellite GPS Receiver Measurements

While sensitivity measurements may use single GPS satellite stimulus, many other GPS receiver measurements may use a test stimulus which simulates multiple GPS satellites. More specifically, measurements such as time to first fix (TTFF), position accuracy, and/or dilution of precision may need the GPS receiver to obtain a position fix. Because a GPS receiver may use four GPS satellites to obtain a 3D position fix, each of these measurements may take longer than the sensitivity measurements. As a result, many position fix measurements may be performed in validation and verification, and not in production test.

Thus the GPS receiver may be provided with a multi GPS satellite signal. While performing GPS simulation, TTFF and/or position accuracy measurements may be taken for the GPS receiver. Optionally, recording of RF GPS signals and playback may be sued to validate receiver performance over a broad range of environmental conditions.

Measuring Time to First Fix (TTFF) and Position Accuracy

Time to first fix (TTFF) and position accuracy measurements are important in the design validation stage of a GPS receiver. For example, in consumer GPS applications, the time that it takes for the GPS receiver to return its actual location can significantly affect the GPS receiver's usability. In addition, the accuracy with which a GPS receiver returns its reported location is important as well. In order for a GPS receiver to obtain a position fix, it may download the almanac and ephemeris information from the GPS satellite through a navigation message. Because it takes thirty seconds for a GPS receiver to download an entire GPS frame, a "cold start" TTFF condition can take anywhere from thirty to sixty seconds. In fact, many GPS receivers specify several TTFF conditions. The most common are cold start, warm start, and hot start.

Cold Start: The GPS receiver may download almanac ephemeris information to achieve a position fix. Because at least one GPS frame may be downloaded from each of the GPS satellites, most modern GPS receivers will achieve a position fix from a cold start condition in 30 to 60 seconds.

Warm Start: The GPS receiver may have some almanac information that is less than one week old, but does not have any ephemeris information. Typically, the GPS receiver may know the time to within 20 seconds and the position to within 100 kilometers. Most modern GPS receivers may achieve a position fix from a warm condition in less than 60 seconds, but can sometimes achieve a position fix in less time.

Hot Start: A hot start occurs when a GPS receiver has up-to-date almanac and ephemeris information. In this scenario, the GPS receiver may only need to obtain timing information from each GPS satellite to return its position fix location. Most modern GPS receivers will return a position fix from a hot start condition within anywhere from 0.5 to 20 seconds.

In most cases, TTFF and position accuracy may be specified at a specific power levels. It is worth noting that it is valuable to verify the accuracy of both of these specifications under a variety of circumstances. Because GPS satellites circle the earth every 12 hours, the range of available GPS satellites may vary substantially even throughout the course of one day to ensure that our receiver returns the appropriate result under a broad range of conditions.

Thus the GPS Simulator may be operable to perform TTFF and/or position accuracy measurements using various sources of data, including: 1) live data where the GPS receiver is set-up in its deployment environment with an antenna, 2) recorded data where a GPS receiver is tested with an RF signal that was recorded off of the air, and/or 3) simulated data where an RF generator is used to simulate the exact time-of-week when live data was recorded. In some embodiments, only one source of data may be used to test the GPS receiver, however two or more sources of data may be used, i.e., to correlate results with that from the other data source(s).

Measurement Setup

For recording signals from real GPS satellites, a recording location may be chosen where the GPS satellites are least obstructed from the surrounding. Note that TTFF measurement may be performed using various start modes of the GPS chipset. In order to measure horizontal position accuracy, an error may be determined based on the reported latitude and longitude coordinates. As these figures are reported in degrees, they may be converted to meters with the following approximation:

$$\text{Deviation(meters)} = \sqrt{\begin{pmatrix} (LatDeviation \times 111325\ m)^2 + \\ (LongDeviation \times 111325\ m)^2 \end{pmatrix}}$$

In the equation above, 111,325 meters (111.325 km) is equivalent to one degree (of 360) rotation around the earth. This figure is based on a calculation of the earth's circumference being 360×111.325 km=40.077 km.

Off-The-Air GPS

Another measurement may be taken by measuring a GPS receiver's TTFF in an off-the-air scenario, where the GPS receiver is directly connected to an antenna. This measurement allows the GPS Simulator to calibrate any automated measurements made from recorded and/or simulated GPS signals. The GPS receiver may be programmed to a cold start scenario for this measurement. The off-the-air GPS signals may be correlated with simulated and playback signals, such as by matching the C/N ratio of off-the-air, simulated, and/or recorded GPS signals.

Recorded GPS Signals

While TTFF and position deviation may be measured with live signals, these measurements may be non-repeatable, as GPS satellites are orbiting the earth. One technique for obtaining repeatable TTFF and position accuracy measurements is by using recorded GPS signals. Recorded GPS signals may be re-generated using an RF vector signal generator. Upon playback, the easiest way to calibrate the RF power level power may be by matching the live C/N ratio with the recorded C/N ratio. For example, off-the-air signals may have a peak C/N of between 47 and 49 dB-Hz for all live signals. At a playback power level that results in the same C/N ratio as the live signal, the reported TTFF and position accuracy may be well correlated with that of the live signal.

Simulated GPS Signals

Another source of GPS test signals for time-to-first-fix and position accuracy measurements may be simulated multi-satellite GPS signals. As discussed above, the GPS Simulator may be able to simulate up to 12 satellites at user-defined time-of-week, week number, and location of the GPS receiver. This method of GPS signal simulation may result in a GPS signal with a desirable signal to noise ratio. In some embodiments, the SNR for the simulated GPS signal(s) may be selectable by the user (i.e., to test the GPS receiver under various conditions).

When testing a receiver with simulated multi GPS satellite waveform, a required RF power may be estimated by correlating the GPS receiver's reported C/N ratio. Once the RF power level is properly correlated, the GPS Simulator may proceed to measure TTFF. For example, when measuring TTFF, the RF vector signal generator may be first started. After some small delay (e.g., five seconds), the GPS receiver may be placed into a "cold" start mode. Once the GPS receiver obtains a position fix, it may report the TTFF information.

In addition, to measuring TTFF, the LLA accuracy and repeatability may be calculated by creating simulations at various time-of-weeks. When testing accuracy at various (simulated) times during the week, a better testing pattern may be generated as the available GPS satellites change substantially even over the course of several hours (such as various latitude, longitude, and altitude information).

For example, an exemplary GPS receiver may have a maximum horizontal position error of 5.2 meters and an average horizontal position error of 1.5 meters. It is noted that accuracy of a GPS receiver may be dependent on the available GPS satellites it can use. Thus, while a GPS receiver's accuracy may vary substantially over the course of several hours (when satellites change), the repeatability from one run to the next is high. As noted, one of the benefits of using simulated GPS signals is that they enable repeatable position results. This is important in the design validation stage, as it enables determining if the reported position does not vary from one design iteration to the next.

Measuring Dynamic Position Accuracy

In some embodiments, the method may test a GPS receiver by measuring the receiver's tracking ability to maintain a position fix at a wide range of power levels and velocities. Historically, one common approach to this type of testing (often merely a functional test) is with a combination of drive testing and multi-path fading emulation. In a drive test, a GPS receiver may be simply driven through a route that is known for introducing significant signal impairments. While the drive test is a simple way to apply natural impairments to GPS satellite signals, these measurements are often non-repeatable for obvious reasons (i.e., it is very difficult to recreate the same conditions/locations of the GPS satellites, etc.).

In fact, the combination of factors such as movement of GPS satellites, changes in weather conditions, and even time of year may affect a GPS receiver's performance. Thus, one increasingly common method to validate receiver performance in a scenario with significant signal impairments is by recording the GPS signal on a drive test.

Once the GPS signal(s) are recorded, the GPS receiver(s) can be tested over and over again with the same set of test data. In the experiments described below, we tracked the receiver's latitude, longitude, and velocity over time. Data may be read from the GPS receiver using a serial port and reading NMEA-183 commands at a rate of once per second. The data may include receiver characteristics such as position and satellite carrier-to-noise ratios. Note that these measurements can also be performed while analyzing other information as well. While horizontal dilution of precision (HDOP) was not measured in the results below, these characteristics may also provide significant information about a GPS receiver's position fix accuracy.

The command interface of the receiver and the RF generation may be tightly synchronized. For example, the RF vector signal generator may be synchronized with the GPS module a start trigger. Using this synchronization method, the vector signal generator and GPS receiver may be synchronized to within one clock cycle of the arbitrary waveform generator (100 MS/s), yielding a maximum skew of 10 μS. In addition, this information may be relatively repeatable from one trial to the next.

In some embodiments, the drive test data may also be simulated, thus obviating the need for a physical drive test. Thus the same data as listed above with regard to a drive test may be generated by the GPS simulator.

As we have seen from the techniques described above, there are a variety of methods for testing GPS receivers. While basics measurements such as sensitivity are almost always used in production test, measurement techniques can be used to validate a receiver's performance. As noted, GPS receivers may be tested with both simulated and recorded baseband waveforms. With a combined approach, engineers may be able to perform comprehensive of multiple aspects of GPS receiver functionality, from sensitivity to tracking repeatability.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for testing a GPS receiver, the method comprising:
   reading one or more GPS files from a computer memory, wherein each of the one or more GPS files contains data for a plurality of GPS satellites;
   receiving parameters for a GPS receiver;
   selecting two or more GPS satellites out of the plurality of GPS satellites;
   generating two or more GPS signals for the two or more GPS satellites, wherein each of the two or more GPS signals contains data for a respective GPS satellite of the two or more selected GPS satellites;
   operating on the two or more GPS signals using the received parameters for the GPS receiver to generate two or more calculated GPS signals;
   re-sampling each of the two or more calculated GPS signals to a common rate, wherein said re-sampling each of the calculated two or more GPS signals to the common rate comprises aligning each of the calculated two or more GPS signals to the common rate;
   adding the two or more re-sampled GPS signals together to create a composite GPS signal;
   generating the composite GPS signal using a hardware signal generator, wherein the composite GPS signal is operable to test the GPS receiver; and
   repeating said re-sampling, adding, and generating the composite GPS signal multiple times in an iterative manner to test the GPS receiver.

2. The method of claim 1, further comprising:
   receiving user input specifying one or more conditions for the one or more GPS signals, wherein the one or more conditions comprise at least one of:
   power level for the one or more GPS satellites;
   initial Doppler level;
   initial pseudorange;
   urban canyon effects;
   atmospheric parameters;
   solar activity; or
   weather.

3. The method of claim 1,
   wherein said selecting the two or more GPS satellites receiving additional user input selecting the two or more GPS satellites.

4. The method of claim 1,
   wherein said selecting the two or more GPS satellites comprises automatically selecting the two or more GPS satellites.

5. The method of claim 1,
   wherein the parameters of the GPS receiver comprise one or more of:
   location of the GPS receiver; or
   movement characteristics of the GPS receiver.

6. The method of claim 1, wherein said operating comprises one or more of:
   calculating an offset for a carrier frequency for each of the two or more GPS signals;
   calculating a rate change due to a Doppler shift for each of the two or more GPS signals; or
   scaling an amplitude of each of the two or more GPS signals.

7. The method of claim 1,
   wherein said selecting the two or more satellites comprises selecting using one or more factors, wherein the one or more factors include at least one of:
   a pseudorandom check;
   a Doppler frequency check;
   a satellite elevation check;
   a satellite health check; or
   a fit interval check.

8. The method of claim 1, wherein said calculating comprises calculating one or more of:
   delay for each of the one or more GPS signals;
   doppler shift;
   doppler spreading;
   clock bias;
   clock drift; or
   power attenuation.

9. The method of claim 1, further comprising:
   reading test results back from the GPS receiver; and
   displaying the test results.

10. The method of claim 1, further comprising:
    executing a graphical program, wherein the graphical program comprises a plurality of interconnected nodes that visually indicate functionality of the graphical program;

wherein the graphical program is executable to perform to said operating.

11. The method of claim 10, further comprising:
creating the graphical program, wherein said creating the graphical program comprises:
arranging a plurality of nodes on a display; and
interconnecting the plurality of nodes in response to user input.

12. The method of claim 10,
wherein the graphical program comprises a block diagram portion and a user interface portion.

13. The method of claim 10,
wherein the graphical program comprises a graphical data flow program.

14. The method of claim 10,
wherein, during execution of the graphical program, the graphical user interface is displayed on a display of a first computer system and the block diagram executes on a second computer system.

15. The method of claim 10, further comprising:
reading test results back from the GPS receiver; and
displaying the test results in the graphical user interface.

16. A non-transitory computer accessible memory medium which stores program instructions for simulating GPS signals to test a GPS receiver, wherein the program instructions are executable by a processor to perform:
reading one or more GPS files, wherein each of the one or more GPS files contains data for a plurality of GPS satellites;
receiving parameters for the GPS receiver;
selecting two or more GPS satellites out of the plurality of GPS satellites;
generating two or more GPS signals for the two or more GPS satellites, wherein each of the two or more GPS signals contains data for a respective GPS satellite of the two or more selected GPS satellites;
operating on the two or more GPS signals using the received parameters for the GPS receiver to generate two or more calculated GPS signals;
re-sampling each of the two or more calculated GPS signals to a common rate, wherein said re-sampling each of the calculated two or more GPS signals to the common rate comprises aligning each of the calculated two or more GPS signals to the common rate;
adding the two or more re-sampled GPS signals together to create a composite GPS signal, wherein the composite GPS signal is operable to be generated using a hardware signal generator, wherein the composite GPS signal is operable to test the GPS receiver; and
repeating said re-sampling, adding, and generating the composite GPS signal multiple times in an iterative manner to test the GPS receiver.

17. The non-transitory memory medium of claim 16, wherein the program instructions are executable by a processor to further perform:
executing a graphical program, wherein the graphical program comprises a plurality of interconnected nodes that visually indicate functionality of the graphical program;
wherein the graphical program is executable to perform to said operating.

18. The non-transitory memory medium of claim 17, wherein the program instructions are executable by a processor to further perform:
reading test results back from the GPS receiver; and
displaying the test results in the graphical user interface.

19. A system for testing a GPS receiver, the system comprising:
a processor;
a memory medium coupled to the processor;
a hardware RF generator coupled to a GPS receiver;
wherein the memory medium stores program instructions which are executable by the processor to:
read one or more GPS files, wherein each of the one or more GPS files contains data for a plurality of GPS satellites;
receive parameters for a GPS receiver;
select two or more GPS satellites out of the plurality of GPS satellites;
generate two or more GPS signals for the two or more GPS satellites, wherein each of the two or more GPS signals contains data for a respective GPS satellite of the two or more selected GPS satellites;
operate on the two or more GPS signals using the received parameters for the GPS receiver to generate two or more calculated GPS signals;
re-sample each of the two or more calculated GPS signals to a common rate, wherein said re-sampling each of the calculated two or more GPS signals to the common rate comprises aligning each of the calculated two or more GPS signals to the common rate; and
add the two or more re-sampled GPS signals together to create a composite GPS signal;
repeat said re-sampling and adding the composite GPS signal multiple times in an iterative manner;
wherein the hardware RF generator is configured to generate the composite GPS signal for each iteration, wherein the composite GPS signal is used to test the GPS receiver.

* * * * *

UNITED STATES PATENT AND TRADEMARK OFFICE
CERTIFICATE OF CORRECTION

| | | |
|---|---|---|
| PATENT NO. | : 8,040,276 B2 | Page 1 of 1 |
| APPLICATION NO. | : 12/434769 | |
| DATED | : October 18, 2011 | |
| INVENTOR(S) | : Vadlamani et al. | |

It is certified that error appears in the above-identified patent and that said Letters Patent is hereby corrected as shown below:

In the Claims:

Column 28
Line 56, please delete "doppler shift;" and substitute --Doppler shift;--.
Line 57, please delete "doppler spreading;" and substitute --Doppler spreading;--.

Signed and Sealed this
Sixth Day of December, 2011

David J. Kappos
*Director of the United States Patent and Trademark Office*